United States Patent
Morita et al.

[11] Patent Number: 5,969,712
[45] Date of Patent: Oct. 19, 1999

[54] COORDINATE READING APPARATUS AND STATUS CONVERTING METHOD, INTERFACE UNIT, AND COORDINATE READING SYSTEM THEREFOR

[75] Inventors: Yoshiyuki Morita; Kazumichi Suzuki, both of Chiba, Japan

[73] Assignee: Seiko Instruments Information Devices Inc., Japan

[21] Appl. No.: 08/824,568

[22] Filed: Mar. 26, 1997

[30] Foreign Application Priority Data

Mar. 27, 1996 [JP] Japan ...................................... 8-072685
Dec. 24, 1996 [JP] Japan ...................................... 8-343949

[51] Int. Cl.⁶ ..................................................... G09G 5/00
[52] U.S. Cl. .......................... 345/179; 345/173; 345/180; 345/146; 345/352; 178/19.01; 178/19.02; 178/19.04
[58] Field of Search ..................................... 345/146, 173, 345/179, 352, 180, 182, 183; 178/19.01, 193.02, 19.04, 19.05

[56] References Cited

U.S. PATENT DOCUMENTS

| | | | |
|---|---|---|---|
| 5,004,871 | 4/1991 | Purcell | 178/19.04 |
| 5,119,079 | 6/1992 | Hube et al. | 345/173 |
| 5,296,838 | 3/1994 | Suzuki | 345/179 |
| 5,384,688 | 1/1995 | Rockwell | 345/179 |
| 5,534,893 | 7/1996 | Hansen, Jr. et al. | 345/179 |
| 5,612,720 | 3/1997 | Ito | 345/179 |
| 5,717,435 | 2/1998 | Fukushima et al. | 345/179 |
| 5,734,377 | 3/1998 | Fukuzaki | 345/173 |

OTHER PUBLICATIONS

Microsoft Paintbrush; Windows 3.1, Osborne McGraw–Hill publication, 90 DOC 9987654 and ISBN 0–07–881725–0; pp. 301–302., Jan. 1, 1992.
Patent Abstracts of Japan, vol. 014, No. 482 (P–1119) Oct. 19, 1990.
Patent Abstracts of Japan, vol. 018, No. 500 (P–1802).
Patent Abstracts of Japan, vol. 010, No. 140 (P–458) May 23, 1986.
Patent Abstracts of Japan, vol. 095, No. 001 Feb. 28, 1995.
Patent Abstracts of Japan, vol. 095, No. 001 Nov. 30, 1995.

*Primary Examiner*—Mark R. Powell
*Assistant Examiner*—Vincent E. Kovalick
*Attorney, Agent, or Firm*—Adams & Wilks

[57] ABSTRACT

To realize a coordinate reading apparatus which is capable of easily setting a particular function to a switch provided on a coordinate indicator, and an interface unit and a coordinate reading system for the coordinate reading apparatus. A coordinate detecting section 21 detects a coordinate value for a position indicated by a coordinate indicator 3 and a switch status. A function selecting means 22 determines that a menu provided on a tablet 2 is read from the coordinate value and the status, to store functional data assigned to the menu in a memory means 23. A conversion status determining means 24 determines that the inputted status coincide with the status to be converted stored in the memory means 23, to notify coincidence to a conversion status output means 25. Receiving the notification, the conversion status output means 25 outputs data to be outputted stored in the memory means 23 instead of inputted switch status.

48 Claims, 19 Drawing Sheets

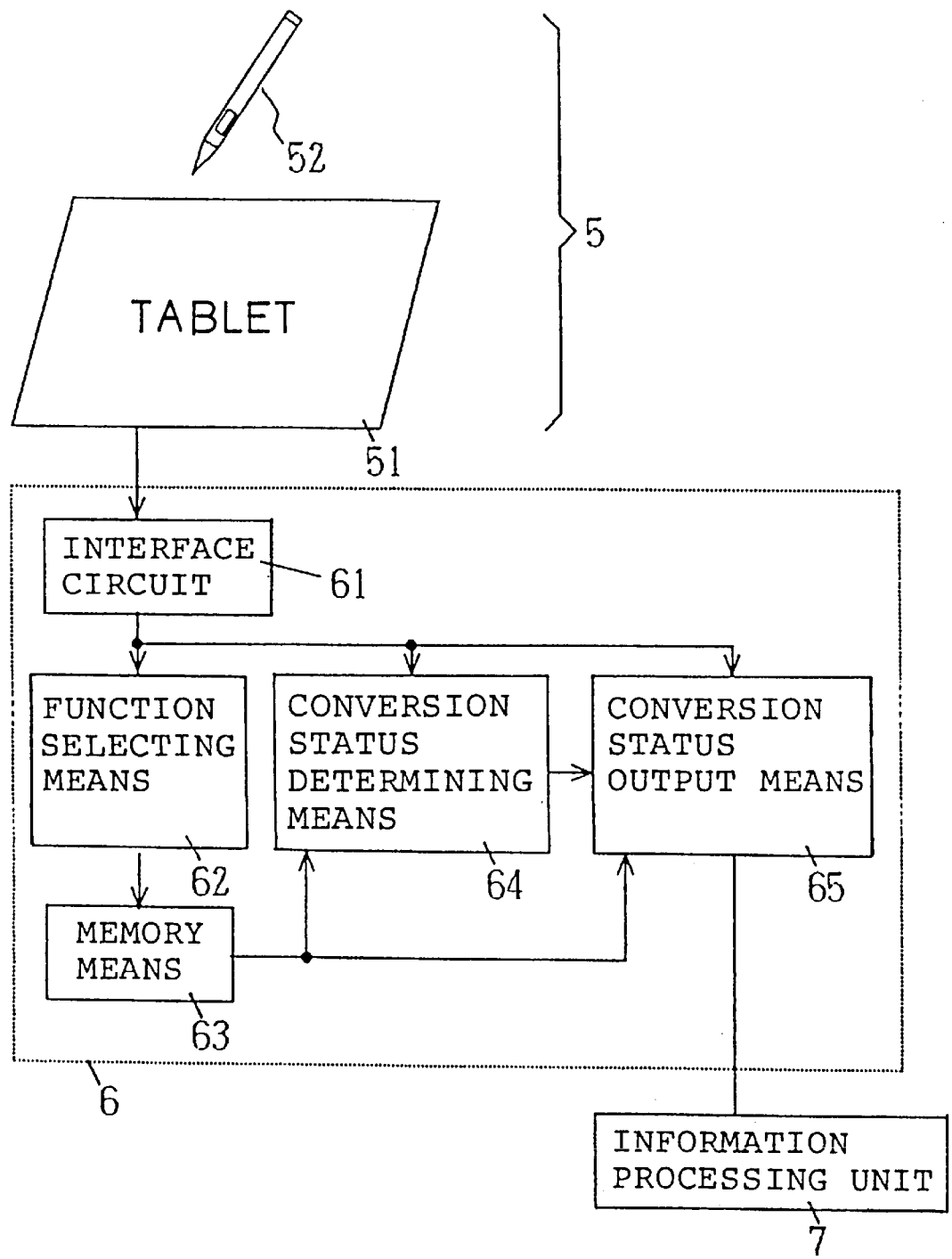
F I G. 5

F I G. 1 0

|  | STATUS PATTERN TO BE CONVERTED | DATA TO BE OUTPUTTED |
|---|---|---|
| MEMORY REGION 1 | TURNING OF SWITCH 2 OFF → ON | KEY — CODE 'cmd' |
| MEMORY REGION 2 | TURNING OF SWITCH 4 OFF → ON | KEY — CODE 'undo' |
| MEMORY REGION 3 | TURNING OF SWITCH 3 OFF → ON | KEY — CODE 'copy' |

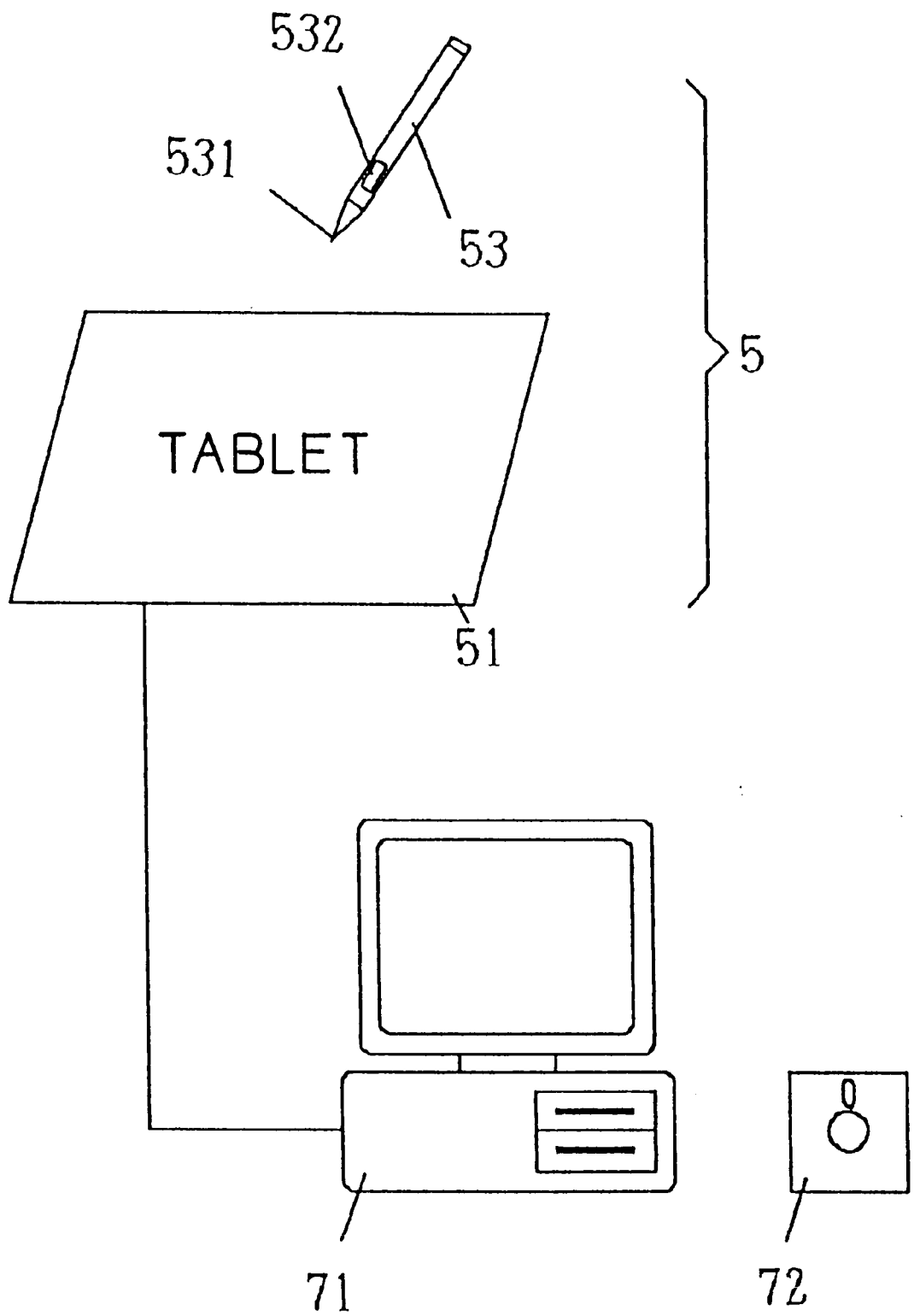
F I G. 1 2

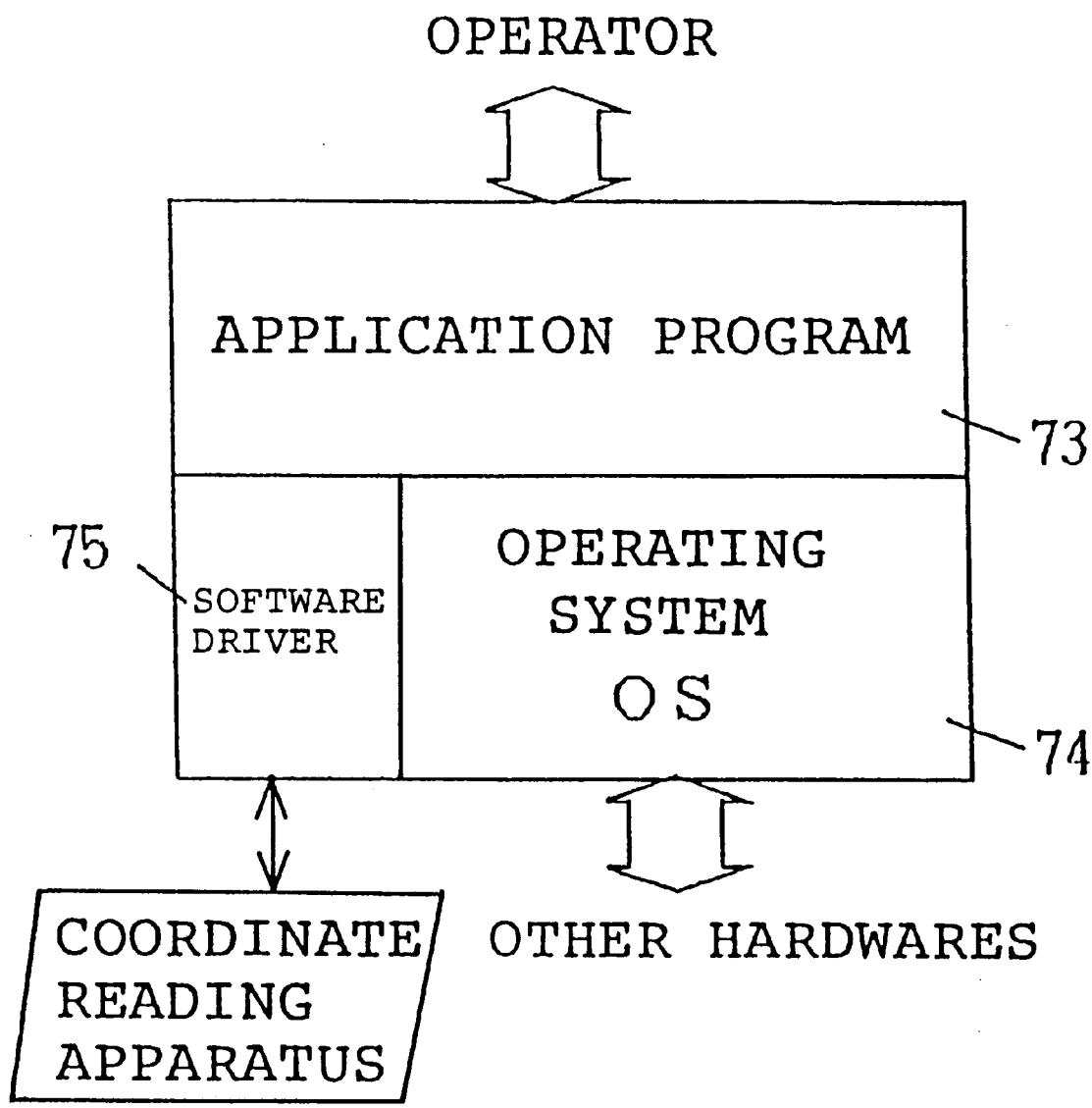
F I G. 1 3

F I G. 1 6
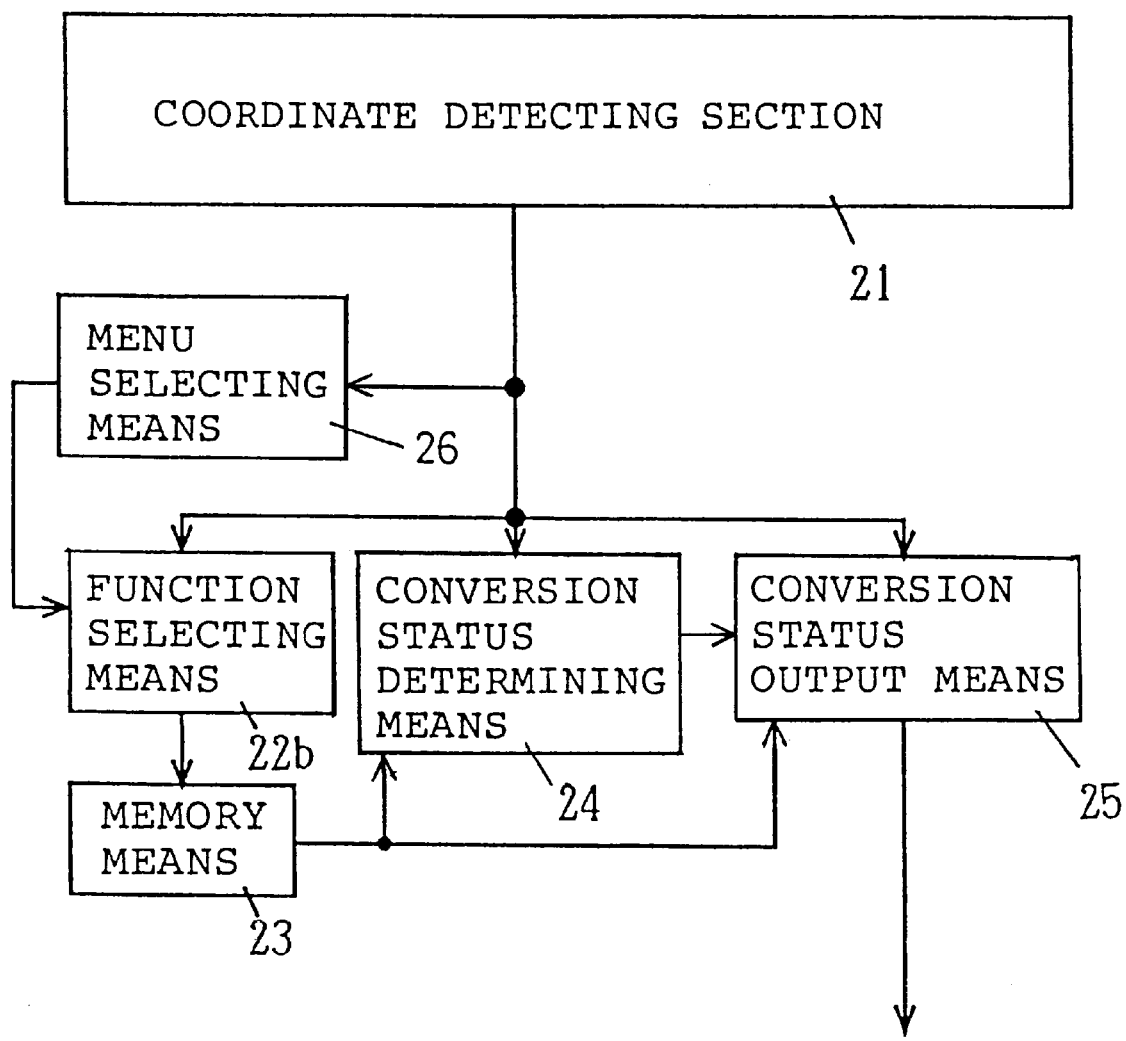

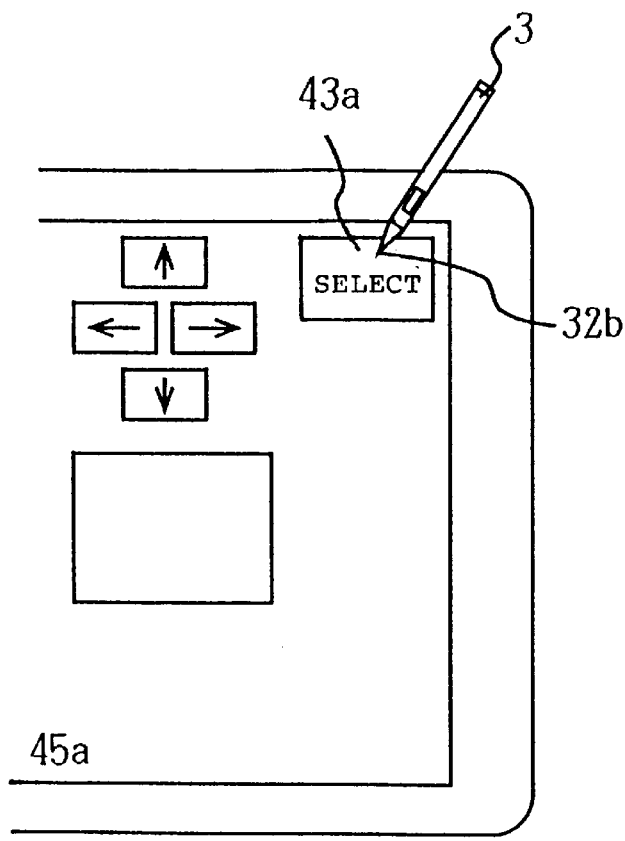
F I G. 1 8 A
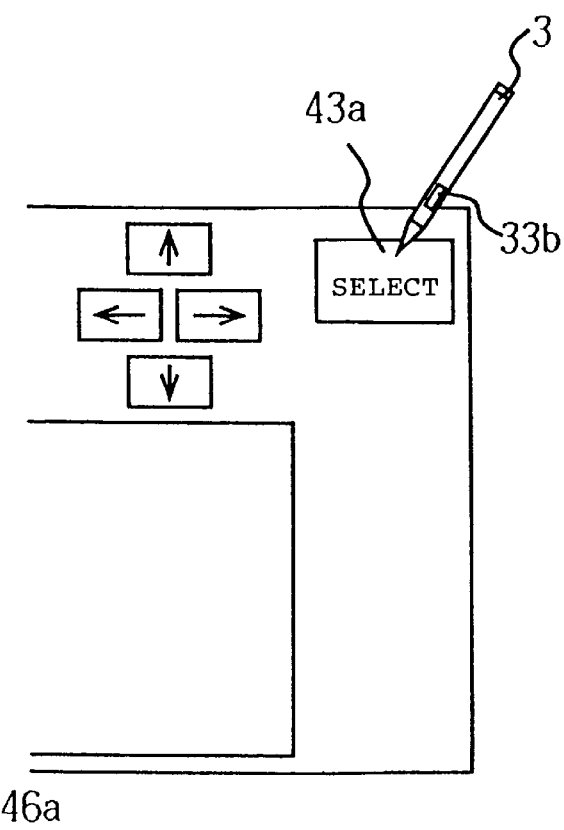
F I G. 1 8 B

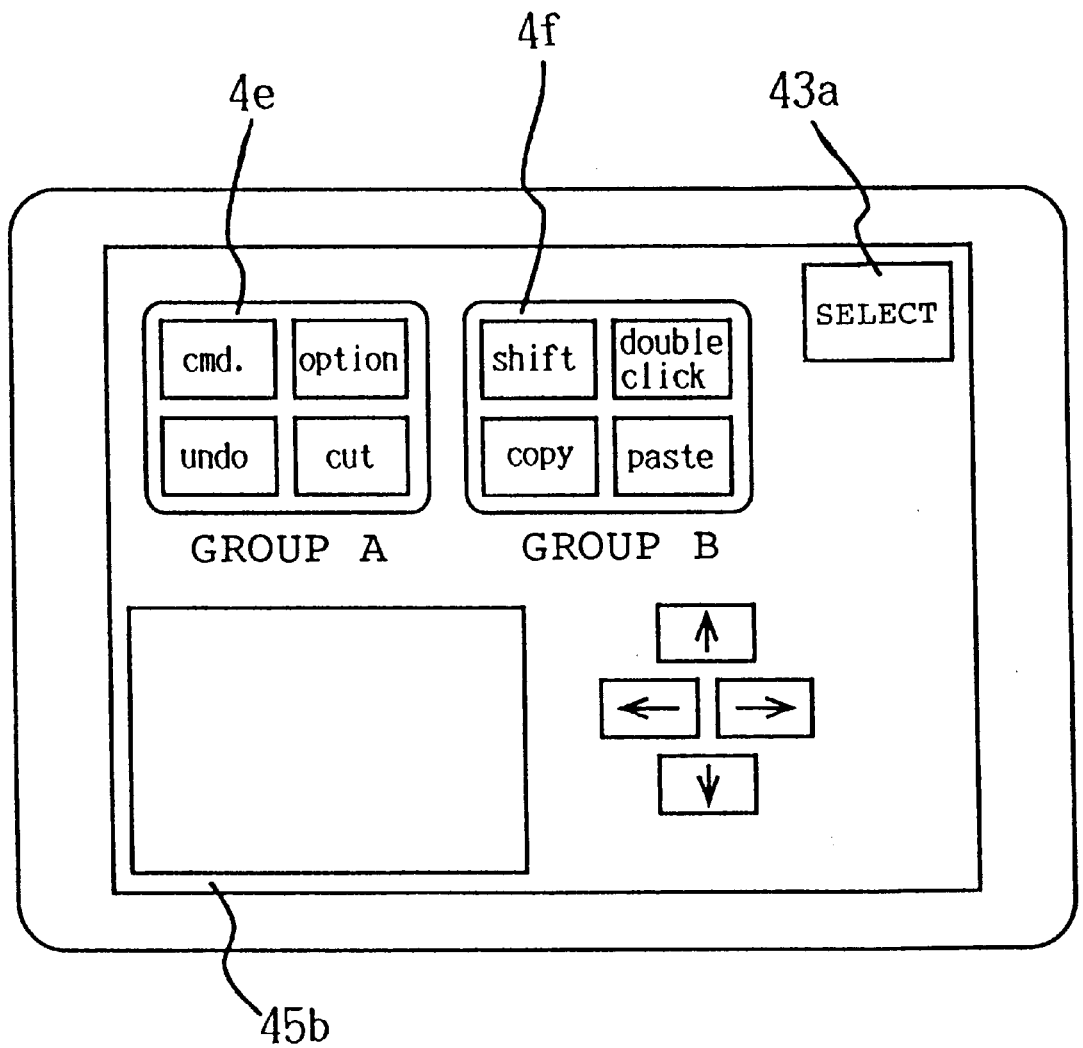
F I G. 1 9

COORDINATE READING APPARATUS AND STATUS CONVERTING METHOD, INTERFACE UNIT, AND COORDINATE READING SYSTEM THEREFOR

BACKGROUND OF THE INVENTION

This invention relates to a coordinate reading apparatus for outputting coordinate values and switch statuses to an information processing unit such as a computer, to an interface unit for connecting the coordinate reading apparatus to an information processing unit, and a coordinate reading system having the aforesaid interface unit, and more particularly to such an apparatus for converting switch statuses to be outputted.

The coordinate reading apparatus is an input device which is connected to an information processing unit such as a computer and has functions of outputting coordinate values and switch statuses of a coordinate indicator. The ordinary coordinate reading apparatus has a coordinate indicator commonly called a stylus pen by which indication is made on a tablet to detect coordinate values and switch statuses. The stylus pen in many cases is provided with a switch called a pen switch and a switch called a side switch. The pen switch is a switch interlocked to a core thereof projecting at the pen tip, which is turned on/off by depressing and releasing a core tip. Meanwhile, the side switch is provided on a part of a pen shaft, which is turned on/off by a sliding operation with a finger.

A coordinate reading apparatus such as this is connected to a computer to constitute a system wherein an application program with a particular function is to be executed while inputting coordinate values and switch status. This herein is referred to herein as a coordinate reading system. In recent years, in coordinate reading systems such as this, there is a movement towards standardizing the specification for connecting an apparatus and an application program to offer as software drivers. The formats of coordinate values and switch statuses outputted from a coordinate reading apparatus vary between apparatuses. The software driver has a function of converting this into a common format as required by an application program for outputting.

Furthermore, in software drivers, new functions have been provided for purposes of improving the application program usability, besides the basic format-conversion function as described above.

For example, there has been realized a function that, when the side switch is depressed, the switch status is converted and outputted as if the pen switch was quickly depressed twice (the operation like this is generally called double clicking). A computer which performs computer filing operation by a graphical user interface, such as a computer like a Macintosh by US Apple Computer, Inc., can open a file by double clicking. According to the aforesaid function, this operation can be effected by once depressing the side switch instead of actually turning on/off the pen switch twice.

Also in another example, there is a function of locking the coordinate axis by depressing the side switch when inputting figures. For example, it is assumed in a certain drawing program that the computer screen be considered as an X-Y plane to draw a straight line. In a usual operation of inputting an arbitrary straight line, the pen switch is turned on by pointing to a start point of a straight line and moving the pen to an end point while keeping it on (such operation is generally called dragging), and then the pen switch is turned off. Where the X-axis is locked to draw a straight line parallel to the X-axis, there is arrangement in an application program level such that dragging is to be done while depressing the shift key of the keyboard. Thus, when the side switch is depressed, thus is converted into a status by the software driver as if the shift key of the keyboard was depressed, and delivered to the application program. By doing so, the above operation is effected by the operation wherein the start point of a straight line is pointed to be dragged with the side switch kept depressed, making keyboard operation unnecessary.

Furthermore in another example, in the case of moving or copying files, whenever there is a function requiring shifting, the same is effected depending on whether the user is depressing the side switch or not. In a filing operation with graphical user interface as above, the pointing and dragging of a file operates as moving the file. And where copying a file, dragging is to be done while depressing an optional key of the keyboard. Thus, when the side switch is depressed, this is converted into a status by the software driver as if the optional key of the keyboard was depressed, and delivered to the application program. By doing so, the above operation is achieved by pointing a file to be copied and dragging with the side switch kept depressed, also making keyboard operation unnecessary.

There has already been realized an environment in which there is assigned various functions to the side switchby a software driver wherein the functions thereof are used by change-over of an application.

However, although the assigning of function to the side switch for use per se leads to improvement in usability, there has been a newly-raised problem as to how to change over such various functions. As the recent, in such cases that a plurality of application programs are simultaneously opened for execution, there is necessity of frequent change-over of functions assigned to the side switch, similarly to change-over of applications.

Amongst conventional software drivers, there has been one which is arranged for example to open a function-changing window on the display such that change-over is made there. The change-over operation in this case requires the following steps:

(1) starting by double clicking a setup program of the software driver on the display. On this occasion, if the file is hierarchical and no icon is displayed, there are required further opening operations for opening.

(2) pointing to a menu for a function to be set to the side switch among menus being displayed.

(3) closing the setup program.

In this manner, the conventional software driver requires opening of windows one by one, and furthermore there are necessities of executing a plurality of steps, making this approach difficult to use.

SUMMARY OF THE INVENTION

The present invention has been made in order to improve the usability as to the setting of the conventional software driver described above, and objects thereof lie in the points given hereinbelow.

That is, to realize a coordinate reading apparatus which is capable of easily setting a particular function to a switch provided on a coordinate indicator, and an interface unit and a coordinate reading system for the coordinate reading apparatus.

Further in detail, to realize a coordinate reading apparatus and an interface unit and a coordinate reading system for the coordinate reading apparatus, which are capable of setting a particular function to a switch provided on a coordinate indicator only by operation on the coordinate reading apparatus without operating a computer, etc.

In order to solve the above problems, in a first structure of a coordinate reading apparatus according to the present invention, in a coordinate reading apparatus constituted by a tablet and a coordinate indicator having a plurality of switches to output a coordinate value for a position indicated by said coordinate indicator and a status of said switch, said coordinate reading apparatus, being structured by providing: said tablet being provided with a menu assigned with a function to be set to said switch; a switch function setting means for setting the function assigned to said menu to said switch by indicating said menu with said coordinate indicator and operating a predetermined switch; a switch status converting means for converting and outputting the status of said switch in accordance with the function set by said switch function setting means.

Also in a second structure, in the above-described first structure, said switch function setting means has, a function selecting means for distinguishing that the coordinate value for the position indicated by said coordinate indicator is included in a region of the menu assigned with the function to be set to said switch, and determining that said switch has become a predetermined state corresponding to menu reading, and a selecting functional data configured by a status pattern to be converted of said switch and data to be outputted, and a memory means for storing functional data selected by said function selecting means; and said switch status converting means has, a conversion status determining means for determining that a status pattern of the operated switch coincides with the status pattern to be converted of said functional data, and a conversion status output means for outputting the data to be outputted of said functional data when coincidence of the status patterns is determined by said conversion status determining means.

Furthermore, the above-described first and second structures are rearranged to structure a coordinate reading apparatus as shown hereinbelow.

(1) A structure that the plurality of switches of the coordinate indicator comprising a menu-pointing switch and other switches; said tablet being provided with a menu for selecting said other switches and a menu assigned with a function to be set to a selected switch; a switch function setting means for setting, by indicating said menu with said coordinate indicator and operating said menu-pointing switch, the function assigned to said menu to said other switches selected by said menu; and a switch status converting means for converting and outputting the status of said other switches in accordance with the function set by said switch function setting means.

(2) In the above-described structure (1), said switch function setting means has a switch selecting means for distinguishing that the coordinate value for the position indicated by said coordinate indicator is included in a range of the menu for selecting said other switches and determining that said menu-pointing switch has become a predetermined state corresponding to menu reading, to select one switch from said other switches; a function selecting means for distinguishing that the coordinate value for the position indicated by said coordinate indicator is included in a range of the menu assigned with the function for setting to said switches and determining that said menu-pointing switch has become a predetermined state corresponding to menu reading, to select functional data configured by a status pattern to be converted of said selected switch and data to be outputted, and a memory means for storing switch information selected by said switch selecting means and the functional data selected by said function selecting means; and said switch status converting means has, a conversion status determining means for determining that an operated switch is a switch corresponding to the functional data stored in said memory means and further determining that the status pattern of the operated switch coincides with the status pattern to be converted of said functional data; and a conversion status output means for outputting data to be outputted of said functional data when it is determined that the status patterns coincide with by said conversion status determining means, thereby structuring a coordinate reading apparatus.

(3) A tablet being provided with a menu assigned with a function to be set to said switch; a switch function setting means for setting the function assigned to an indicated menu to said switch by indicating said menu with said coordinate indicator and operating among said switches a switch to be set with the function; a switch status converting means for converting and outputting the status of said switch in accordance with the function set by said switch function setting means, thereby structuring a coordinate reading apparatus.

(4) In the above-described structure (3), said switch function setting means has, a function selecting means for distinguishing that the coordinate value for the position indicated by said coordinate indicator is included in a range of the menu assigned with the function for setting to said switches and determining that the switch to be set with said function has become a predetermined state corresponding to menu reading, to select functional data configured by a status pattern to be converted of said selected switch and data to be outputted, and a memory means for storing switch information of said operated switch and the functional data selected by said function selecting means; and said switch status converting means has, a conversion status determining means for determining that the operated switch is a switch corresponding to the functional data stored in said memory means and further determining that the status pattern of the operated switch coincides with the status pattern to be converted of said functional data, and a conversion status output means for outputting data to be outputted of said functional data when it is determined that the status patterns coincide with by said conversion status determining means, thereby structuring a coordinate reading apparatus.

(5) The plurality of switches comprises a pen switch which is turned on/off interlocking to the movement of a pen core and a side switch provided on a pen shaft; said tablet being provided with a menu assigned with a function to be set to said side switch; a switch function setting means for setting the function assigned to said menu to said side switch by indicating said menu with said coordinate indicator and operating said pen switch; a switch status converting means for converting and outputting the status of said side switch in accordance with the function set by said switch function setting means, thereby structuring a coordinate reading apparatus.

(6) In the above-described structure (5), said switch function setting means has, a function selecting means for distinguishing that the coordinate value for the position indicated by said stylus pen is included in a region of the menu assigned with the function to be set to said side switch, and determining that said pen switch has become a predetermined state corresponding to menu reading, to select functional data configured by a status pattern to be converted of said side switch and data to be outputted; and a memory means for storing the functional data selected by said function selecting means; and said switch status converting means has, a conversion status determining means for determining that the status pattern of the operated side switch coincides with the status pattern to be converted of said functional data, and a conversion status output means for outputting the data to be outputted of said functional data when coincidence of the status pattern is determined by said conversion status determining means, thereby structuring a coordinate reading apparatus.

(7) In all the above-described structure, the coordinate reading apparatus is structured on the assumption that amongst said menus the menu assigned with the function to be set to the switch be assigned with a function for outputting one or a plurality of keyboard codes corresponding to said switch.

Furthermore, in the status converting method for a coordinate reading apparatus according to the present invention, a status converting method for a coordinate reading apparatus wherein the coordinate reading apparatus, which is constituted by a coordinate indicator having a plurality of switches and a tablet provided with a menu assigned with a function to be set to said switch, is connected to an information processing unit to input a coordinate value for a position indicated by said coordinate indicator and a status of said switch to the information processing unit for performing predetermined processing, the status converting method for a coordinate reading apparatus being structured by having: the process of distinguishing that the coordinate value for the position indicated by said coordinate indicator is included in a region of the menu assigned with the function to be set to said switch and determining that said switch has become a predetermined state corresponding to menu reading, to select functional data configured by a status pattern to be converted of said switch and data to be outputted; and the process of storing the functional data selected by the process of selecting said functional data.

Furthermore, a first procedure for the above-described status converting method was rearranged as given hereinbelow to structure status converting methods for a coordinate reading apparatus.

(1) A status converting method for a coordinate reading apparatus being structured wherein the coordinate reading apparatus, which is constituted by a coordinate indicator having a menu-pointing switch and other switches, a menu for selecting said other switches, and a tablet provided with a menu assigned with a function to be set to a selected switch, is connected to an information processing unit to input a coordinate value for a position indicated by said coordinate indicator and a status of said switch to the information processing unit for performing predetermined processing, the status converting method for a coordinate reading apparatus structured by having: the first process of distinguishing that the coordinate value for the position indicated by said coordinate indicator is included in a region of the menu for selecting said other switches and determining that said menu-pointing switch has become a predetermined state corresponding to menu reading, to select one switch out of said other switches; the second process of distinguishing that the coordinate value for the position indicated by said coordinate indicator is included in a region of the menu assigned with the function to be set to said switch and determining that said menu-pointing switch has become a predetermined state corresponding to menu reading, to select functional data configured by a status pattern to be converted of said selected switch and data to be outputted; wherein execution is made in the order of the first process and the second process, or the second process and the first process; the process of storing switch information selected by said first process and the functional data selected by said second process.

(2) A status converting method for a coordinate reading apparatus being structured wherein the coordinate reading apparatus, which is constituted by a coordinate indicator having a plurality of switches and a tablet provided with a menu assigned with a function to be set to said switch, is connected to an information processing unit to input a coordinate value for a position indicated by said coordinate indicator and a status of said switch to the information processing unit for performing predetermined processing, the status converting method for a coordinate reading apparatus characterized by having: the process of distinguishing that the coordinate value for the position indicated by said coordinate indicator is included in a region of the menu and determining whether any of said plurality of switches is operated to become a predetermined state corresponding to menu reading, to select functional data configured by a status pattern to be converted of the operated switch and data to be outputted; the process of storing switch information of said operated switch and said functional data selected.

(3) A status converting method for a coordinate reading apparatus being structured wherein the coordinate reading apparatus, which is constituted by a stylus pen being a pen-shaped coordinate indicator with a plurality of switches comprising a pen switch turning on/off interlocking to the movement of a pen core and a side switch provided on a pen shaft, and a tablet provided with a menu assigned with a function to be set to said side switch, is connected to an information processing unit to input a coordinate value for a position indicated by said stylus pen and a status of said switch to the information processing unit for performing predetermined processing, the status converting method for a coordinate reading apparatus was structured by having: the process of distinguishing that the coordinate value for the position indicated by said stylus pen is included in a region of said menu and determining that said pen switch has become a predetermined state corresponding to menu reading, to select functional data configured by a status pattern to be converted of said side switch and data to be outputted; and the process of storing said functional data selected.

(4) In all the above-described procedures of the status converting methods, the status converting methods for a coordinate reading apparatus were structured by providing the process of determining that the operated switch is a switch corresponding to said stored functional data and further determining that the status pattern of the operated switch coincides with the status pattern to be converted of said functional data; and the process of outputting the data to be outputted of said functional data when the status patterns comes coincidence.

(5) In all the above-described procedures of the status converting methods, the status converting methods for a coordinate reading apparatus were structured by, amongst said menus, the menu assigned with the function to be set to the switch is assigned with a function for outputting one or a plurality of keyboard codes corresponding to said switch.

Furthermore, in an interface unit for a coordinate reading apparatus according to the present invention, in a coordinate reading system, which is constituted by a coordinate indicator having a plurality of switches and a tablet provided with a menu assigned with a function to be set to said switch, connected to an information processing unit to input a coordinate value for a position indicated by said coordinate indicator and a status of said switch to the information processing unit for performing predetermined processing, an interface unit for a coordinate reading apparatus being connected between said coordinate reading apparatus and said information processing unit to serve as an interface for the coordinate value and the status of said switch, the interface unit for a coordinate reading apparatus being structured by having: a function selecting means for distinguishing that the coordinate value for the position indicated by said coordinate indicator is included in a region of the menu assigned with a function to be set to said switch and determining that said switch has become a predetermined state corresponding to menu reading, to select functional data configured by a status pattern to be converted of said switch and data to be outputted; a memory means for storing the functional data selected by said function selecting means; a conversion status determining means for determining that the operated switch is a switch corresponding to the functional data stored in said memory means and further determining that the status pattern of the operated switch coincides with the status pattern to be converted of said functional data; and a conversion status output means for outputting data to be outputted of said functional data when the status patterns are determined to be coincident by said conversion status determining means.

Furthermore, a first structure of the above-described interface unit is rearranged as given in hereinbelow to structure interface units for a coordinate reading apparatus.

(1) In a coordinate reading system having a coordinate reading apparatus, which is constituted by a coordinate indicator having a plurality of switches of a menu-pointing switch and other switches, a menu for selecting said other switches, and a tablet provided with a menu assigned with a function to be set to the selected switch, connected to an information processing unit to input a coordinate value for a position indicated by said coordinate indicator and a status of said switch to the information processing unit for performing predetermined processing, an interface unit for a coordinate reading apparatus being connected between said coordinate reading apparatus and said information processing unit to serve as an interface for the coordinate value and the status of said switch, the interface unit for a coordinate reading apparatus being structured by having: a switch selecting means for distinguishing that the coordinate value for the position indicated by said coordinate indicator is included in a region of the menu for selecting said other switches and determining that said menu-pointing switch has become a predetermined state corresponding to menu reading, to select one switch out of said other switches; a function selecting means for determining that the coordinate value for the position indicated by said coordinate indicator is included in a region of the menu assigned with a function to be set to said switch and determining that said menu-pointing switch has become a predetermined state corresponding to menu reading, to select functional data configured by a status pattern to be converted of said selected switch and data to be outputted; a memory means for storing switch information selected by said switch selecting means and the functional data selected by said function selecting means; a conversion status determining means for determining that the operated switch is a switch corresponding to the functional data stored in said memory means and further determining that the status pattern of the operated switch coincides with the status pattern to be converted of said functional data; and a conversion status output means for outputting data to be outputted of said functional data when the status patterns are determined to be coincident by said conversion status determining means.

(2) In a coordinate reading system having a coordinate reading apparatus, which is constituted by a coordinate indicator having a plurality of switches and a tablet provided with a menu assigned with a function to be set to said switch, connected to an information processing unit to input a coordinate value for a position indicated by said coordinate indicator and a status of said switches to the information processing unit for performing predetermined processing, an interface unit for a coordinate reading apparatus being connected between said coordinate reading apparatus and said information processing unit to serve as an interface for the coordinate value and the status of said switch, the interface unit for a coordinate reading apparatus being structured by having: a function selecting means for determining that the coordinate value for the position indicated by said coordinate indicator is included in a region of the menu assigned with a function to be set to said switches and determining that said switch to be set with the function has become a predetermined state corresponding to menu reading, to select functional data configured by a status pattern to be converted of said switches and data to be outputted; a memory means for storing switch information for setting said function and functional data selected by said function selecting means; a conversion status determining means for determining that the operated switch is a switch corresponding to the functional data stored in said memory means and further determining that the status pattern of the operated switch coincides with the status pattern to be converted of said functional data; and a conversion status output means for outputting data to be outputted of said functional data when the status patterns are determined to be coincident by said conversion status determining means.

(3) In a coordinate reading system having a coordinate reading apparatus, which is constituted by a stylus pen being a pen-shaped coordinate indicator with a plurality of switches comprising a pen switch turning on/off interlocking to the movement of a pen core and a side switch provided on a pen shaft and a tablet provided with a menu assigned with a function to be set to said side switch, connected to an information processing unit to input a coordinate value for a position indicated by said stylus pen and a status of said switch to the information processing unit for performing predetermined processing, an interface unit for a coordinate reading apparatus being connected between said coordinate reading apparatus and said information processing unit to serve as an interface for the coordinate value and the status of said switch, the interface unit for a coordinate reading apparatus being structured by having: a function selecting means for determining that the coordinate value for the position indicated by said stylus pen is included in a region of the menu assigned with a function to be set to said pen switch and determining that said side switch has become a predetermined state corresponding to menu reading, to select functional data configured by a status pattern to be converted of said side switch and data to be outputted; a memory means for storing the functional data selected by said function selecting means; a conversion status determining means for determining that the status pattern of the operated side switch coincides with the status pattern to be converted of said functional data; and a conversion status output means for outputting data to be outputted of said functional data when the status patterns are determined to be coincident by said conversion status determining means.

(4) In all the above-described structure of the interface units, said menu is provided in plurality of number, amongst said plurality of menus the menu assigned with a function to be set to the switches being assigned with functions of outputting one or a plurality of keyboard codes corresponding to said switches, said plurality of menus having a plurality of menus displaying said keyboard codes, Furthermore, a coordinate reading system according to the present invention was structured by a coordinate reading apparatus structured by a coordinate indicator having a plurality of switches and a tablet provided with a menu assigned with a function to be set to said switch, an interface unit connected to said coordinate reading apparatus to serve as an interface for the coordinate value and the status of said switches, and an information processing unit connected to said interface unit, so that a coordinate value for a position indicated by said coordinate indicator and a status of said switches are inputted to the information processing unit for performing predetermined processing, the coordinate reading system being structured by having: a function selecting means for distinguishing that the coordinate value for the position indicated by said coordinate indicator is included in a region of the menu assigned with a function to be set to said switch and determining that said switch has become a predetermined state corresponding to menu reading, to select functional data configured by a status pattern to be converted of said switch and data to be outputted; a memory means for storing the functional data selected by said function selecting means; a conversion status determining means for determining that the operated switch is a switch corresponding to the functional data stored in said memory means and further determining that the status pattern of the operated switch coincides with the status pattern to be converted of said functional data; and a conversion status output means for outputting data to be outputted of said functional data when the status patterns are determined to be coincident by said conversion status determining means.

Furthermore, a first structure of the above-described coordinate reading system was rearranged as given hereinbelow to structure coordinate reading systems.

(1) A coordinate reading system structured by a coordinate reading apparatus structured by a coordinate indicator having a plurality of switches of a menu-pointing switch and other switches, a menu for selecting said other switches, and a tablet provided with a menu assigned with a function to be set to the selected switch, an interface unit connected to said coordinate reading apparatus to serve as an interface for the coordinate value and the status of said switch, and an information processing unit connected to said interface unit, so that a coordinate value for a position indicated by said coordinate indicator and a status of said switch are inputted to the information processing unit for performing predetermined processing, the coordinate reading system being structured by having: a switch selecting means for distinguishing that the coordinate value for the position indicated by said coordinate indicator is included in a region of the menu for selecting said other switches and determining that said menu-pointing switch has become a predetermined state corresponding to menu reading, to select one switch out of said other switches; a function selecting means for determining that the coordinate value for the position indicated by said coordinate indicator is included in a region of the menu assigned with a function to be set to said switch and determining that said menu-pointing switch has become a predetermined state corresponding to menu reading, to select functional data configured by a status pattern to be converted of said selected switch and data to be outputted; a memory means for storing switch information selected by said switch selecting means and functional data selected by said function selecting means; a conversion status determining means for determining that the operated switch is a switch corresponding to the functional data stored in said memory means and further determining that the status pattern of the operated switch coincides with status pattern to be converted of said functional data; and a conversion status output means for outputting data to be outputted of said functional data when the status patterns are determined to be coincident by said conversion status determining means.

(2) A coordinate reading system structured by a coordinate reading apparatus structured by a coordinate indicator having a plurality of switches and a tablet provided with a menu assigned with a function to be set to said switch, an interface unit connected to said coordinate reading apparatus to serve as an interface for the coordinate value and the status of said switch, and an information processing unit connected to said interface unit, so that a coordinate value for a position indicated by said coordinate indicator and a status of said switch are inputted to the information processing unit for performing predetermined processing, the coordinate reading system being structured by having: a function selecting means for determining that the coordinate value for the position indicated by said coordinate indicator is included in a region of the switch assigned with a function to be set to said switches and determining that said switch to be set with a function has become a predetermined state corresponding to menu reading, to select functional data configured by a status pattern to be converted of said switch and data to be outputted; a memory means for storing switch information for setting said function and the functional data selected by said function selecting means; a conversion status determining means for determining that the operated switch is a switch corresponding to the functional data stored in said memory means and further determining that the status pattern of the operated switch coincides with the status pattern to be converted of said functional data; and a conversion status output means for outputting data to be outputted of said functional data when the status patterns are determined to be coincident by said conversion status determining means.

(3) A coordinate reading system structured by a coordinate reading apparatus structured by a coordinate indicator having a plurality of switches comprising a pen switch turning on/off interlocking to the movement of a pen core and a side switch provided on a pen shaft and a tablet provided with a menu assigned with a function to be set to said side switch, an interface unit connected to said coordinate reading apparatus to serve as an interface for the coordinate value and the status of said switch, and an information processing unit connected to said interface unit, so that a coordinate value for a position indicated by said coordinate indicator and a status of said switches are inputted to the information processing unit for performing predetermined processing, the coordinate reading system being structured by having: a function selecting means for determining that the coordinate value for the position indicated by said stylus pen is included in a region of the menu assigned with a function to be set to said side switch and determining that said side switch has become a predetermined state corresponding to menu reading, to select functional data configured by a status pattern to be converted of said side switch and data to be outputted; a memory means for storing the functional data selected by said function selecting means; a conversion status determining means for determining that the status pattern of the operated side switch coincides with status pattern to be converted of said functional data; and a conversion status output means for outputting data to be outputted of said functional data when the status patterns are determined to be coincident by said conversion status determining means.

(4) In all the above-described structures of coordinate reading systems, the coordinate reading systems are structured such that, amongst the functional data, the data is one or a plurality of keyboard codes.

In all the above-described structures of coordinate reading systems, the status converting methods, the interface units, and the coordinate reading systems, there are provided a plurality of menus and wherein a selection menu is provided on the tablet assigned with a function to select the plurality of menus such that a menu selecting menu is provided to select one of the plurality of menus by indicate the selection menu and performing a predetermined switch operation.

While menus involve physical ones to be placed on a tablet and nonphysical ones such as grating virtually provided on a tablet, there are structures and methods of replacing menu sheets with different display for a plurality of menus, and there are structures and methods of changing effective areas with using a same menu sheet.

In order to cope with such environments, in all the above coordinate reading apparatuses, status converting methods, interface units, and coordinate reading systems, arrangements have been made to have a plurality of menu sheets displaying with functions to be set to a switch. Otherwise, a plurality of menus have been arranged to have a menu sheet displaying with functions to be set to a switch. Naturally, it is also possible to provide the latter menu sheet in plurality of number.

BRIEF DESCRIPTION OF THE DRAWINGS

FIG. 5 is a block diagram according to the embodiment of an interface unit for a coordinate reading apparatus and a coordinate reading system according to the present invention;

FIG. 10 is a data-configuration explanatory diagram of functional data according to the first example of the coordinate reading apparatus according to the present invention;

FIG. 12 is a structural diagram of a fourth embodiment of a coordinate reading system according to the present invention;

FIG. 13 is a program configuration diagram for an information processing unit according to the fourth example of the coordinate reading apparatus according to the present invention;

FIG. 16 is a partial block diagram according to the second embodiment of the coordinate reading apparatus according to the present invention;

FIG. 18(A) and FIG. 18(B) are explanatory diagrams of menu selection in another example of the coordinate reading apparatus according to the present invention; and FIG. 19 is an explanatory diagram of menu selection in still another example of the coordinate reading apparatus according to the present invention.

DETAILED DESCRIPTION OF THE PREFERRED EMBODIMENTS

Coordinate Reading Apparatus

Figure 1:
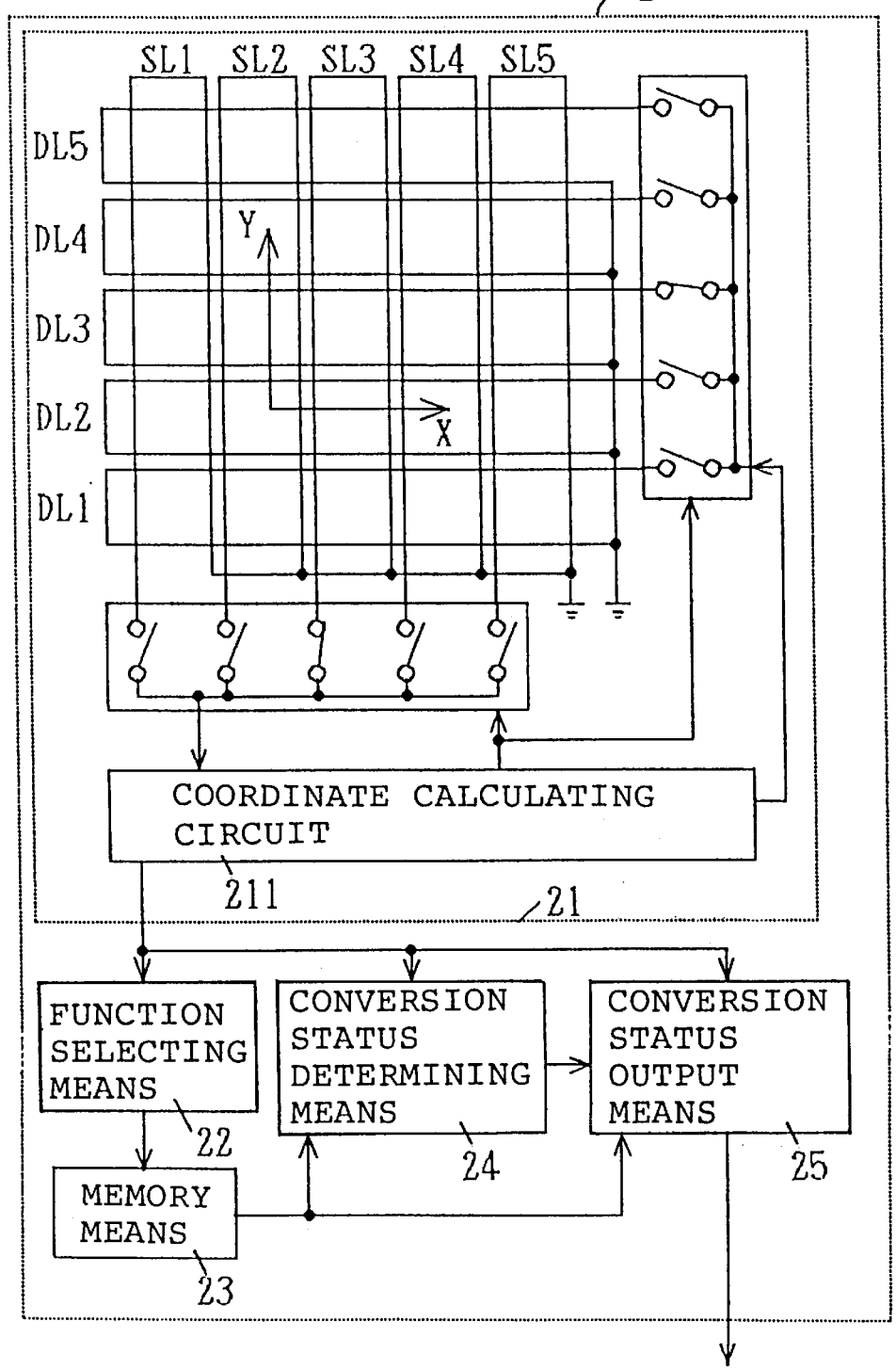
FIG. 1 is a block diagram of an embodiment of a coordinate reading apparatus according to the present invention.
Figure 3:
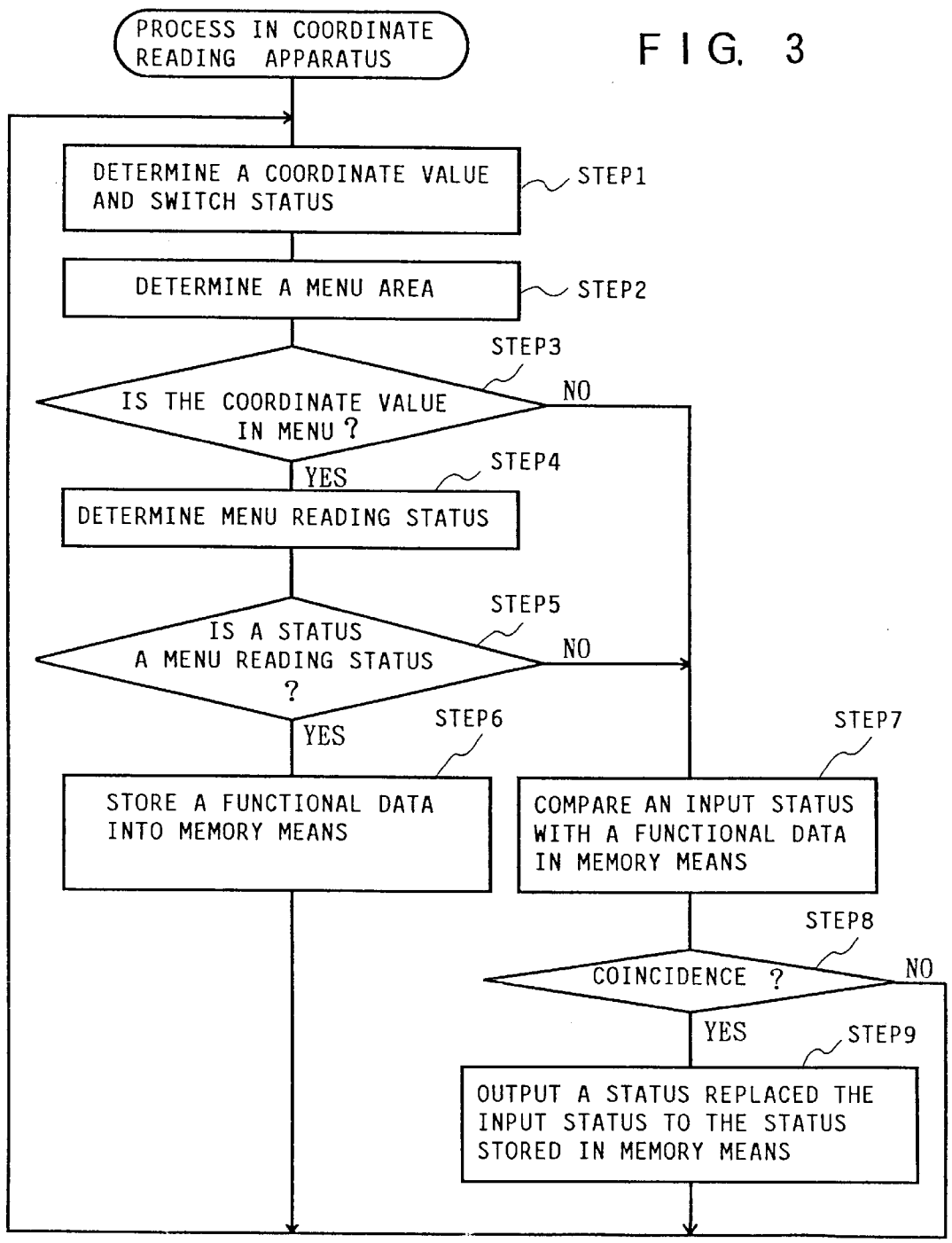
FIG. 3 is a flowchart of internal processes according to the embodiment of the coordinate reading apparatus according to the present invention.
Figure 4:
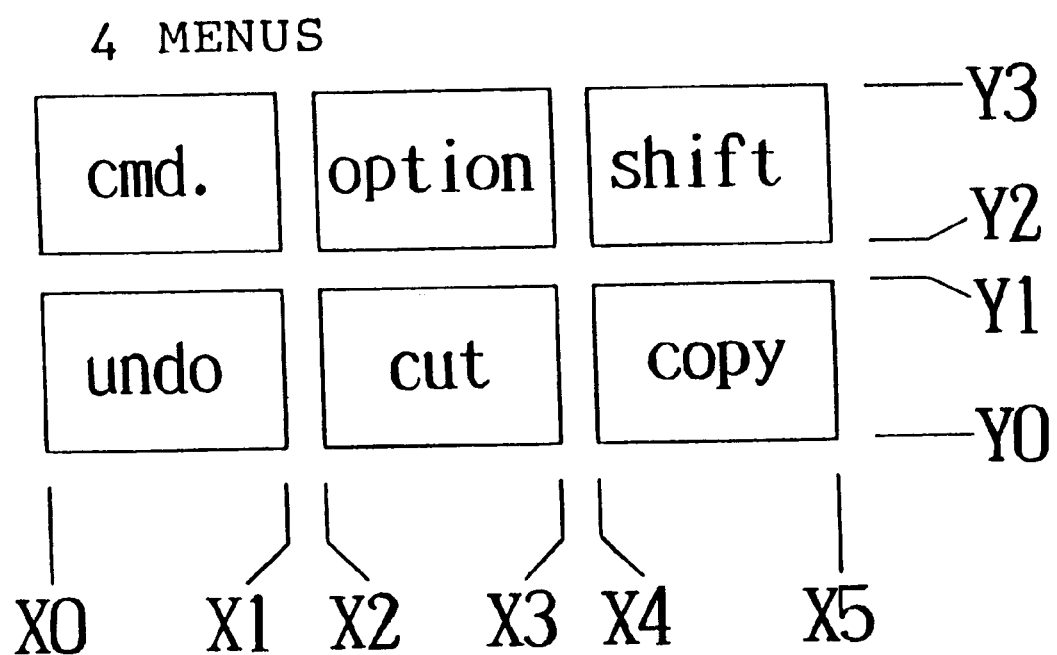
FIG. 4 is a detailed explanatory diagram of a menu according to the embodiment of the coordinate reading apparatus according to the present invention.

Explanation will be made of embodiments of a coordinate reading apparatus according to the present invention based on FIG. 1 to FIG. 4. FIG. 1 is a block diagram of a coordinate reading apparatus, FIG. 2 is a structural diagram of the coordinate reading apparatus, FIG. 3 is a flowchart of internal processes in the coordinate reading apparatus, and FIG. 4 is a detailed explanatory diagram of a menu.

Figure 2:
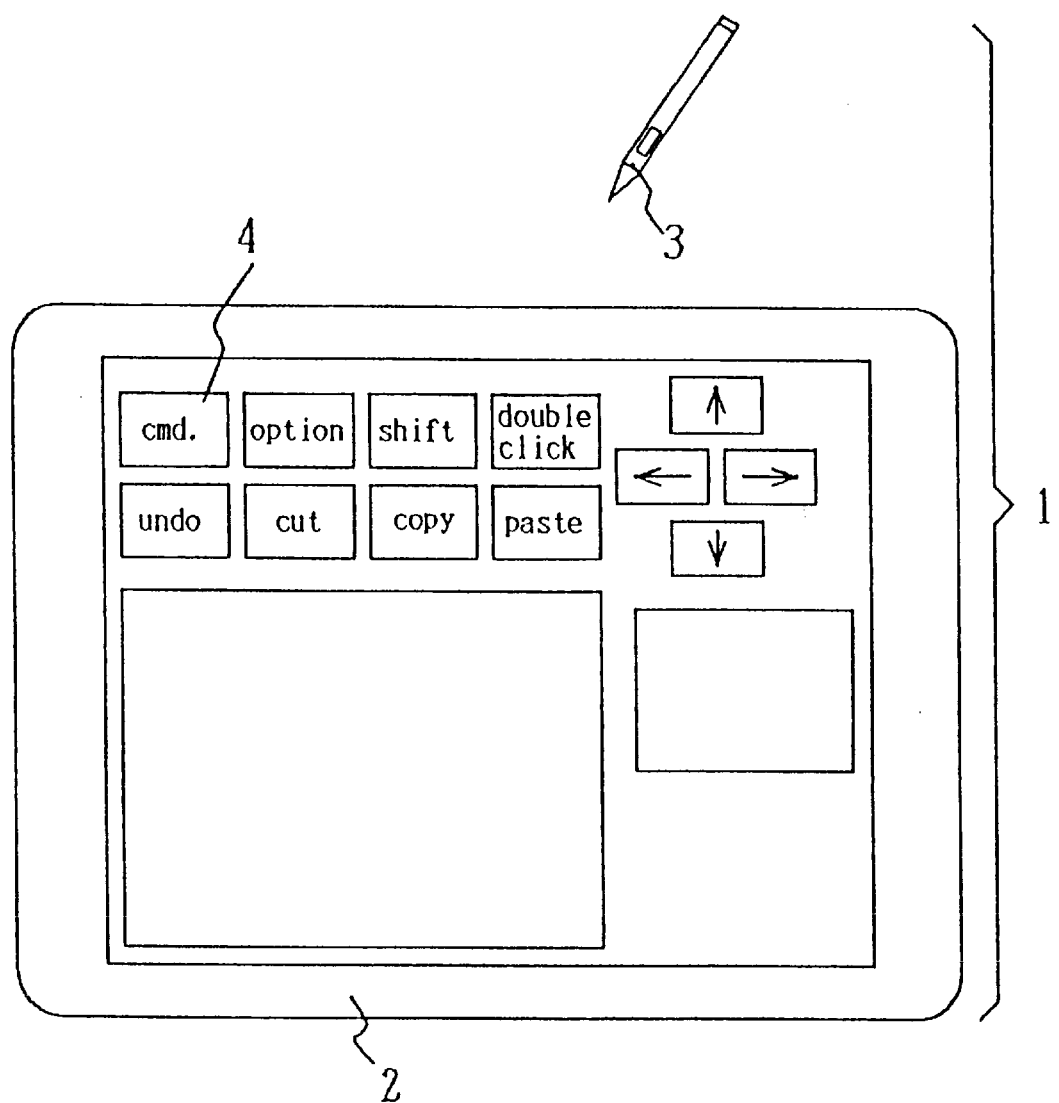
FIG. 2 is a structural diagram according to the embodiment of the coordinate reading apparatus according to the present invention.

First explained is a structure based on FIG. 1 and FIG. 2. As shown in FIG. 2, a coordinate reading apparatus 1 is structured by a tablet 2 and coordinate indicator 3. The surface of the tablet 2 is provided with a coordinate reading surface to allow reading of a point at which the coordinate indicator 3 indicates. The tablet 2 incorporates each processing circuit in the inside thereof.

A menu 4 is displayed on the coordinate-reading surface of the tablet 2. The menu 4 has selectable menu items or "buttons" which are separate areas expressed by frame lines on the inside of which is displayed a function assigned to the menu by characters, etc. The display does not only serve as a menu as explained later, there is provided a function inside the tablet 2 such that, when this region is pointed by the coordinate indicator 3, the indicated coordinate value for a position is converted into a code called a menu code possessing a specific meaning.

The tablet 2 and the coordinate indicator 3 have their structures arranged as shown in FIG. 1. In the coordinate indicator 3, there are provided a resonant circuit 31 formed by a coil and a capacitor for being electromagnetically coupled to the tablet 2 and two switches 32 and 33 having a capacitor connected in series thereto. The coordinate indicator 3 is placed on the coordinate-reading surface of a coordinate detecting section 21 for being used to indicate reading points.

In the tablet 2 are provided a coordinate detecting section 21, a function selecting means 22, a memory means 23, a conversion status determining means 24, and a conversion status output means 25.

In the coordinate reading surface of the coordinate detecting section 21, there is a layer of a plurality of excitation lines DL1 ... DL5 which are coils for creation of a magnetic field, sense lines SL1 ... SL5 for detecting an induced signal due to electromagnetic induction. If the resonant circuit 31 of the above coordinate indicator 3 comes into proximity with the coordinate-reading surface, an induced signal is generated in a sense line by electromagnetic coupling of these excitation lines, sense lines, and resonant circuit 31. A coordinate calculating circuit 211 within the coordinate detecting section 21 detects a coordinate value for a position indicated by the coordinate indicator 3 and a switch status of the coordinate indicator 3. For realizing the coordinate detecting section, it is possible to adopt various known structures.

The function selecting means 22 is connected to the coordinate detecting section 21 to input calculated coordinate values and the switch status of the coordinate indicator 3. The function selecting means 22 monitors each button of the menu 4 from the inputted coordinate value and detects whether the switch status of the coordinate indicator 3 has been set to a status for menu reading. The detection of status, in general, is designed to be read when a switch is depressed to turn the switch status from off to on. It is assumed here that a first switch 32 is turned from off to on. The function selecting means 22 always monitors the coordinate value and the switch status, and selects the function assigned to a selectable menu item when the condition that the status switch is turned from off to on is met. The memory means 23 is connected to the function selecting means 22 to store functional data relevant to the function selected in a manner as above.

Here, explanation will be made on the function assigned to the menu. As shown in FIG. 2, the menu 4 has such items assigned thereto as "cmd.", "option", "shift", and "double click". The apparatus according to the present invention, if these button items are read by operation of the first switch 32 of the coordinate indicator 3, a function for the item is assigned to the second switch 33. For example, if the "cmd." button is read by depressing the first switch 32, thereafter, the depression of the second switch 33 causes outputting of the information assigned to the "cmd." in place of the status of the switch 33 from the coordinate reading apparatus.

The functional data to be stored in the memory means 23 are descriptions in pairs of "status pattern to be converted" and "data to be outputted". For example, for the above "cmd." menu, the "status pattern to be converted" is "turning of second switch from off to on", and the "data to be outputted" is "key-code "cmd." of keyboard".

Again, explanation of the structure will be continued. The conversion status determining means 24 is connected to the coordinate detecting section 21 and the memory means 23, to input switch statuses and always refers to switch statuses to be converted stored in the memory means 23. And where coincident, a coincidence signal representing the coincidence is outputted to the conversion status output means 25. Where not coincident, no coincident signal is outputted and monitoring on the switch status is continued.

The conversion status output means 25 is connected to the coordinate detecting section 21, the memory means 23, and the conversion status determining means 24, and when inputting the coincident signal outputted by the conversion status determining means 24, it converts the switch status inputted from the coordinate detecting section 21 into data to be outputted, as stored in the memory means 23 and outputs the same. While no coincident signal is inputted, the switch status inputted from the coordinate detecting section 21 is outputted as it is.

Among the structural constituents, almost all other elements involving part of the coordinate detecting section 21 are realized in a one-chip microprocessor, and operations are controlled by a program.

Now, operation will be explained. In the coordinate reading apparatus according to the present invention, the following operations are independent:

(1) the operation of assigning functions to the switch by the menu, and (2) the operation of status conversion during coordinate reading.

These will be explained separately hereinbelow.

(1) The operation of assigning functions to the switch by the menus.

FIG. 3 is a flowchart of control operation by the microprocessor constituting the present coordinate reading apparatus. At a first step 1, determinations are made as to the coordinate value of the position at which the coordinate indicator 3 is pointing as well as its switch status. In this process is adapted a method proposed by the conventional coordinate reading apparatus. This process corresponds to the process of the coordinate detecting section 21.

Then at a step 2, it is determined whether the coordinate value is included in a menu area or not. As shown in FIG. 4, coordinate values representing ranges of menu areas are described in a program. X0 ... X5 in FIG. 4 are an X-coordinate value for each menu area. Also, Y0 ... Y3 are a Y-coordinate value for each menu area. The microprocessor compares the coordinate values representing this range with the measured coordinate value to determine whether it is within the button or not. For example, provided that the coordinate value calculated at the step 1 is given as (X, Y), if X0<X<X1 and
Y2<Y<Y3 are satisfied, the determination is as the "cmd." menu. Based on the result associated at the step 2 in this manner, the process is branched at a step 3. Where the determination is within the menu, it proceeds to the next step 4, whereas where the determination is out of the menu, it is branched to a step 7.

Where determined within the menu, it is determined at a next step 4 whether or not the switch status is a status determined with menu reading. Although the particular status associated with menu reading, may be arbitrarily set an assumption is made here that, as explained above, it is determined that the first switch 32 of the coordinate indicator is depressed and the switch status is turned from off to on. Based on the result determined at the step 4, the process is branched at the step 5. Where it is detected that the switch status is turned from off to on, it proceeds to a next step 6, otherwise it branches to a step 7.

Where it is determined in the above process that the menu is read, the functional data assigned to the read menu is stored in the memory means 23 at the next step 6. The data to be stored in the memory means 23 is, as already explained, function data in the pair comprising "status pattern to be converted" and "data to be outputted". Here, an assumption is made that the button "cmd." button is read. Among the function data assigned to this menu, the "status pattern to be converted" is the "turning of the second switch from off to on", and the "data to be outputted" is "key-code "cmd." of keyboard". The above processes from the step 2 to the step 6 correspond to the process of the function selecting means 22.

Incidentally, the steps 2, 3 and the steps 4, 5 may be reversed in order. These four steps are the processes for menu analysis, wherein it is determined whether the condition of the coordinate value and the condition of the switch are both satisfied or not. It is possible to first execute the steps 4, 5 and thereafter execute the steps 2, 3.

(2) The operation of status converting during coordinate reading.

At the step 3 or the step 5 in the flowchart of FIG. 3, where determination is not menu reading, branching is done to a step 7. At the step 7, the switch status inputted from the coordinate detecting section 21 and the "status pattern to be converted" in the functional data stored in the memory means 23 are compared. Now, the "status pattern to be converted" is "turning of second switch from off to on". In the step 7, whenever a new switch status is inputted, monitoring is made whether this status relates to the second switch and changing is done from off to on or not. Based on the result determined at the step 7 in this manner, the process is branched at a step 8. Where the inputted status coincides with "status pattern to be converted", it proceeds to a step 9, whereas in otherwise cases the process of the step 9 is skipped. The above processes at the step 7 and the step 8 correspond to the process of the conversion status determining means 24.

Where the inputted switch status coincides with "status pattern to be converted", at the step 9 the inputted switch status is replaced by the "data to be outputted" stored in the memory means 23 for being outputted. In the present case, "key-code "cmd." of keyboard" is outputted. Where the inputted switch status does not coincide with the "status pattern to be converted", the inputted switch status is outputted as it is without conversion. The above process at the step 9 corresponds to the process of the conversion status output means 25.

As explained above, in the coordinate reading apparatus according to the present invention, where the menu 4 is read, the function assigned to the menu is stored in the memory means 23, whereas where reading other than the menu 4, a switch status which correspond to switch status data stored in the memory means 23 is converted into output data based on the function data stored in the memory mean 23. The functional data associated with a converting condition can be readily altered by reading a menu.

Interface Unit

In the above coordinate reading apparatus, as shown in FIG. 1, the function selecting means 22, the memory means 23, the conversion status determining means 24, and the conversion status output means 25 are all structurally incorporated in the coordinate reading apparatus. However, each section of these may be separated from the coordinate detecting section 21 to form a physically independent interface unit.

FIG. 5 is a block diagram of an interface unit according to the present invention. In the figure, 5 is a coordinate reading apparatus. This is a conventional coordinate reading apparatus, which comprises a tablet 51 and a coordinate indicator 52. The coordinate value for a position at which the coordinate indicator 52 indicates and the switch status, not shown, provided in the coordinate indicator 52 are outputted to the outside.

For outputting of the coordinate reading apparatus 5, an interface unit 6 according to the present invention is connected. The structure of the interface unit 6 is the same structure as the other portions and excluding the coordinate detecting section of the already-explained coordinate reading apparatus. As shown in FIG. 5, an interface circuit 61 is first provided in the interface circuit 6. This is a circuit for connection to the above coordinate reading apparatus 5. To the interface circuit 61 are connected a function selecting means 62, a conversion status determining means 64, and conversion status output means 65. The output of the function selecting means 62 is connected to the memory means 63. Connection is made such that the content stored in the memory means 63 can be referred to by the conversion status determining means 64 and the conversion status output means 65. Also, the output of the conversion status determining means 64 is also connected to the conversion status output means 65.

The interface circuit 61 inputs a coordinate value and a switch status from the connected coordinate reading apparatus 5. The function selecting means 62 inputs the coordinate value and the switch status inputted from the interface circuit 61, to determine whether or not the menu provided on a tablet 51 of the coordinate reading apparatus 5 is being read, and where menu reading has been determined, functional data assigned to the read menu is stored in the memory means 63. The conversion status determining means 64, where the inputted coordinate value and switch status do not indicate menu reading, compares the switch status with "status pattern to be converted" among the functional data stored in the memory means 63. Where coincident, it outputs a coincident signal representing the coincidence to the conversion status output means 65. The conversion status output means 65 inputs this coincident signal to replace the inputted switch status by "data to be outputted" among the function data stored in the memory means 63 for outputting.

As explained above, the interface unit according to the present invention has a switch-status conversion means provided independent of the coordinate reading apparatus, wherein the function as to status conversion is wholly identical.

Coordinate Reading System

As shown in FIG. 5, a coordinate reading system can be structured by connecting the conventional coordinate reading apparatus 5 to the interface unit 6 to which is further connected is an information processing unit 7 such as a computer. The interface unit 6, as stated before, stores functional data for converting the switch status in accordance with the read menu to compare this with an inputted switch status to thereby perform converting processing on the status. The function setting for the switch status can easily be carried out by the interface unit so that it can readily be compatible with various applications operable on the information processing unit 7.

In this manner, where the interface unit 6 is employed in the coordinate reading system, the interface unit 6 may be incorporated in the information processing unit 7. In doing this, the hardware of the interface apparatus 6 may be provided independent of the information processing unit 7, or otherwise the function solely may be realized as software for the information processing unit 7 without providing exclusive hardware. In the latter case, although this function may be added to an application program of the system, it is general practice to realize with an interface section only rendered independent. A program like this is referred to as a software driver. As already stated, the interface unit according to the present invention has a primary object to improve on easiness to use as to functional setting when realized as this software driver.

Although the above explanation is concerned with an embodiment wherein one kind of menu is solely defined on the tablet, it may be structured that a plurality of kinds of menus are defined on the tablet for being used by changing over of them. The below is explanation concerning a coordinate reading apparatus according to a second embodiment of the present invention structured in this manner.

Figure 15A:
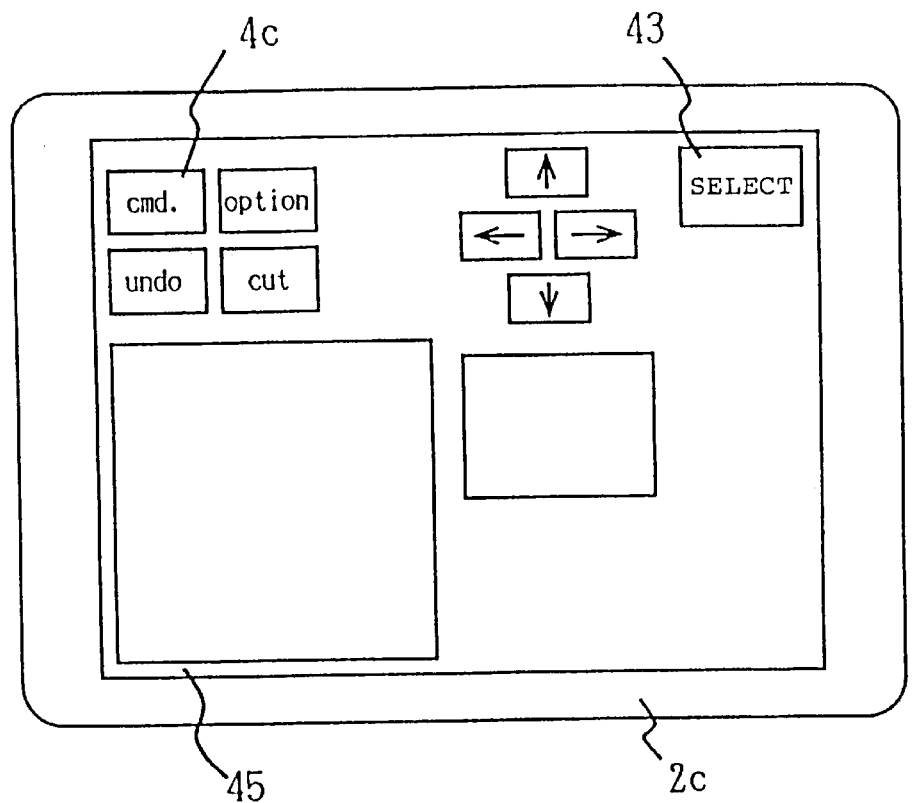
FIG. 15(A) and FIG. 15(B) are structural diagrams of a second embodiment of the coordinate reading apparatus according to the present invention.
Figure 15B:
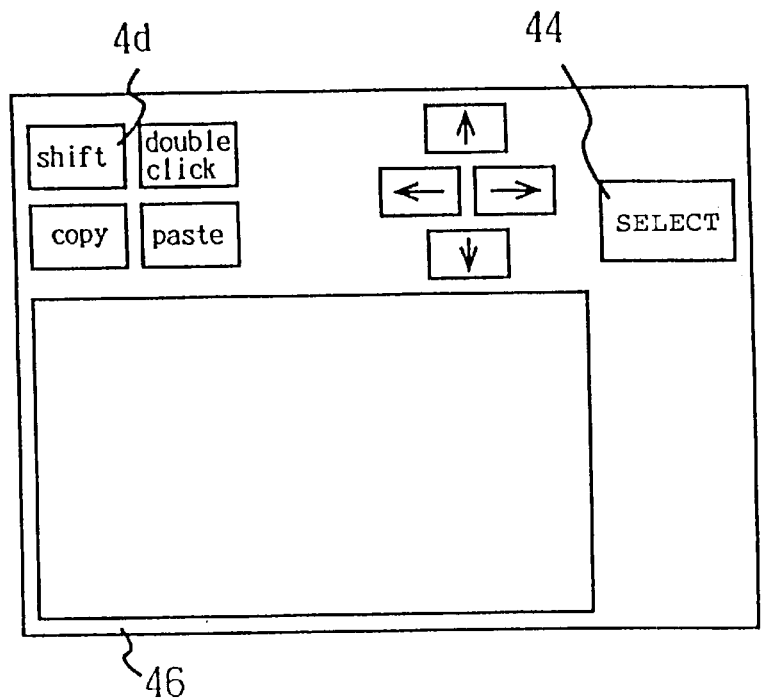

As shown in FIGS. 15A and 15B, in this structure menus are displayed on menu sheets in the form of sheet members. In the figure, there is shown a structure in which two menu sheets A 45 and B 46 are selectively used, wherein in the illustrated state the menu sheet A45 is placed on the tablet 2c.

In the menu sheet A 45 are displayed menu items or buttons A 4c for assigning to the switch of the coordinate indicator and a selection button 43. Similarly, in the menu sheet B 46 are displayed menu items or buttons B 4d for assigning functions to the switch of the coordinate indicator and a selection item or button 44. Among these display items, the buttons for assigning functions to the switch of the coordinate indicator are the same as the above first embodiment. The selection button 43 and the selection button 44 are used for distinguishing which menu (4c or 4d) is to be selected, and are shifted in position of display so as to be placed at different locations on the tablet 2c. With the button sheet A 45 placed on the tablet 2c, if the selection menu is read by the coordinate indicator, thereafter the buttons displayed in the menu A 4c are acknowledged, while, with the button sheet B 46 placed on the tablet 2c, if the selection menu is read by the coordinate indicator, thereafter the buttons displayed in the menu A 4c are acknowledged, which is the function of this structure.

For achieving this function the coordinate reading apparatus is structured as in FIG. 16. A menu selecting means 26 is newly provided and connected to a coordinate detecting section 21 and a function selecting means 22b. The menu selecting means 26 inputs a coordinate value and a switch status from the coordinate detecting section 21, to determine each region of the selection button 43 or the selection button 44 from the coordinate value and to detect whether the switch status has become a specified status determined for menu reading. Although the detected status is arbitrary, similarly to the first embodiment, an assumption is made that the switch being turned from off to on is detected. The menu selecting means 26 always monitors the coordinate value and the switch status, and, when the above condition that the status becomes from switch-off to on is met, it outputs a signal corresponding to the indicated selection button to the function selecting means 22b.

Although the function of the function selecting means 22b is similar to the above first embodiment, since there are a plurality of sets of menus to be distinguished, a function is added for selection, on a plural-menu basis, of position information on menu buttons defined by each menu set and a set of functional-data assigned to each menu. The function selecting means 22b is connected to the above menu selecting means 26 to select which menu is to be distinguished among a plurality of menus based on the signal corresponding to the indicated selection menu. Other constituent elements are the same as the above first embodiment.

Figure 17:
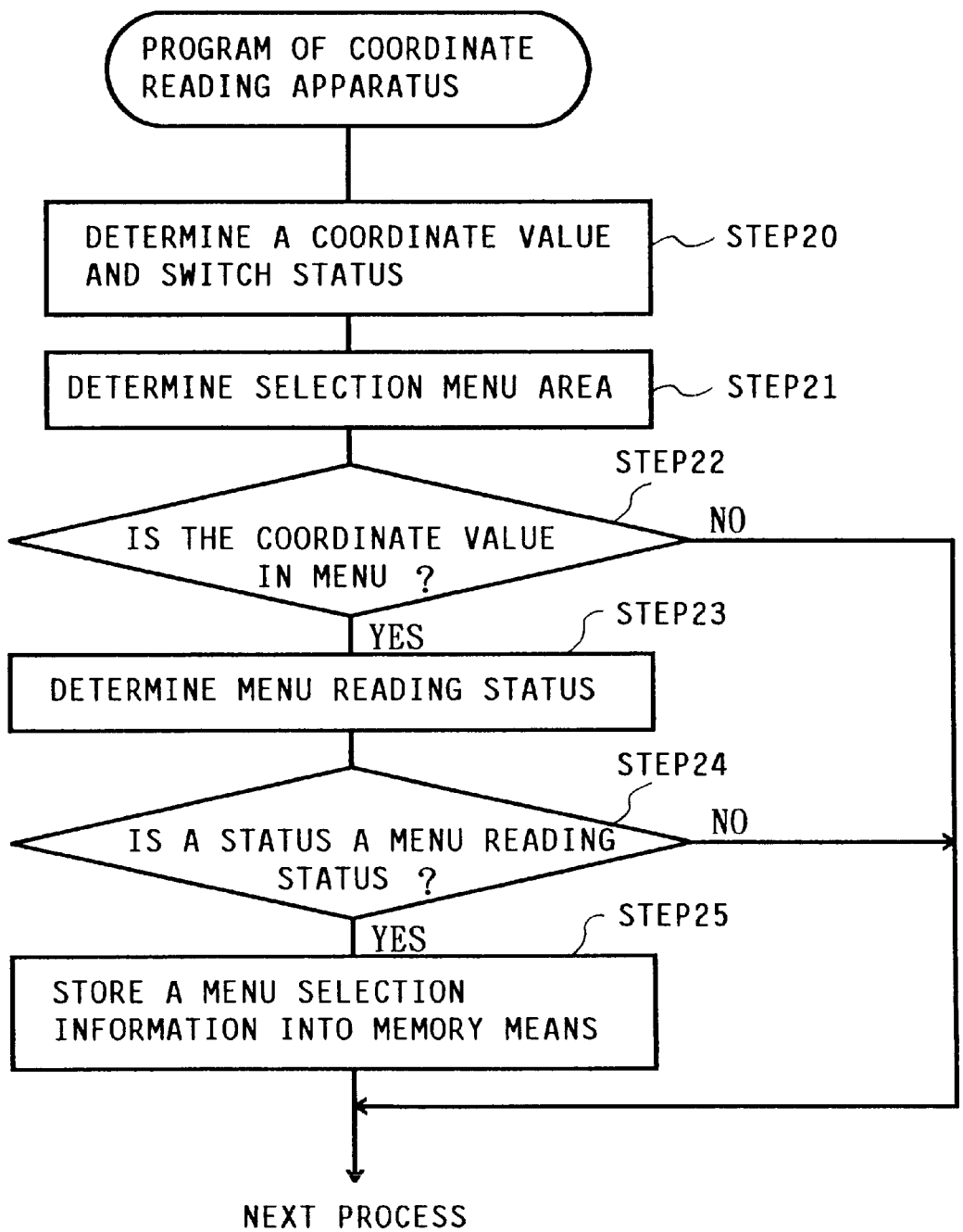
FIG. 17 is a partial flowchart of internal processes according to the second embodiment of the coordinate reading apparatus according to the present invention.

Then the operation will be explained based on a flowchart in FIG. 17. It is assumed that the step 1 in the FIG. 3 flowchart explained in the above first embodiment be replaced by the flowchart of FIG. 17.

First at a step 20, a coordinate value for a position at which the coordinate indicator indicates and a switch status are determined. This process is the same as the step 1 of FIG. 3.

Then at a step 21, it is determined whether the coordinate value is included in a menu region or not. The process for distinguishing the region is similar to the above first embodiment. Based on the result determined at step 21 in this manner, the process is branched at a step 22. Where determined to be within the menu selected, it proceeds to a next step 23, while where determined out of the menu selected, the process of this flowchart ends.

Where determined within the selected menu, at the next step 23 it is determined whether or not the switch status lies in a status determined for reading the selected menu. Here, it is determined that the switch status has been turned from off to on, as was already explained. And, based on the result of this determination, the process is branched at a step 24. Where the switch status is determined to be turned from off to on, it proceeds to a next step 25, while in otherwise cases the process of this flowchart ends.

In the above processes, where the selected menu is determined to be read, at a next step 25 the information about which menu is selected is outputted to the function selecting means 22b. The function selecting means 22b stores this information and selects position information on the menu region for distinguishing between menus and a set of functional data assigned to each menu. The function selecting means 22b may distinguish functional data based on the selected set, similarly to the above first embodiment. The operations from this point on are executed by the step 2 and the later steps of the FIG. 3 flowchart.

As above, the coordinate reading apparatus according to this structure has features that the usage with changing over on display-scene basis is possible because the menus are definable in plurality, and furthermore the change-over of menus can be done by easy operation of reading the selection menus.

In the above, explanations have been made of the coordinate reading apparatus according to the present invention, the interface unit for the coordinate reading apparatus and the coordinate reading system using the interface unit, including the status converting method. As for each structure of these devices, it is possible to place into practice with adding various variations. Hereinbelow, explanations will be made on some examples.

Coordinate Reading Apparatus: First Example

Figure 6:
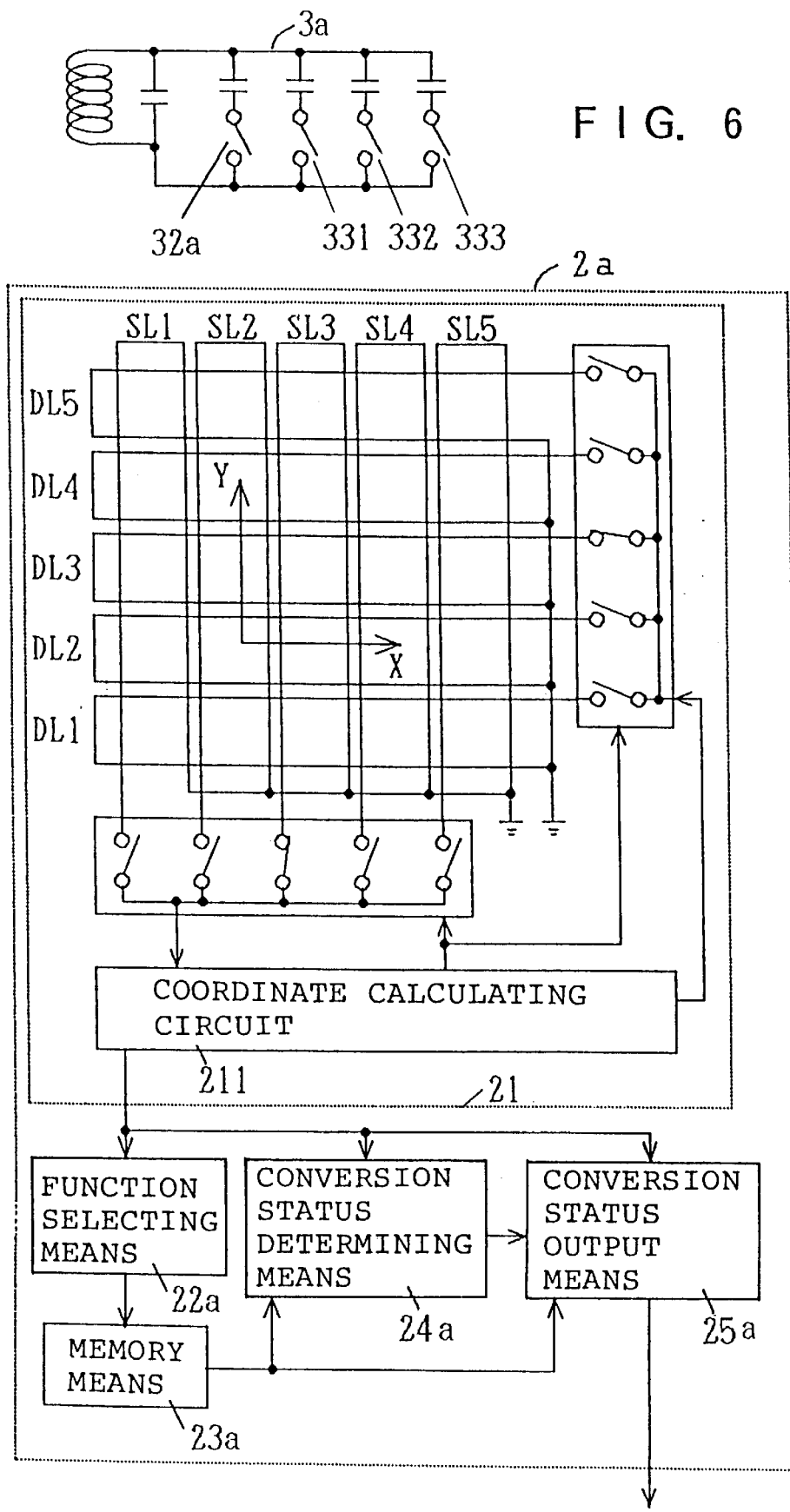
FIG. 6 is a block diagram of a first example of the coordinate reading apparatus according to the present invention.
Figure 8:
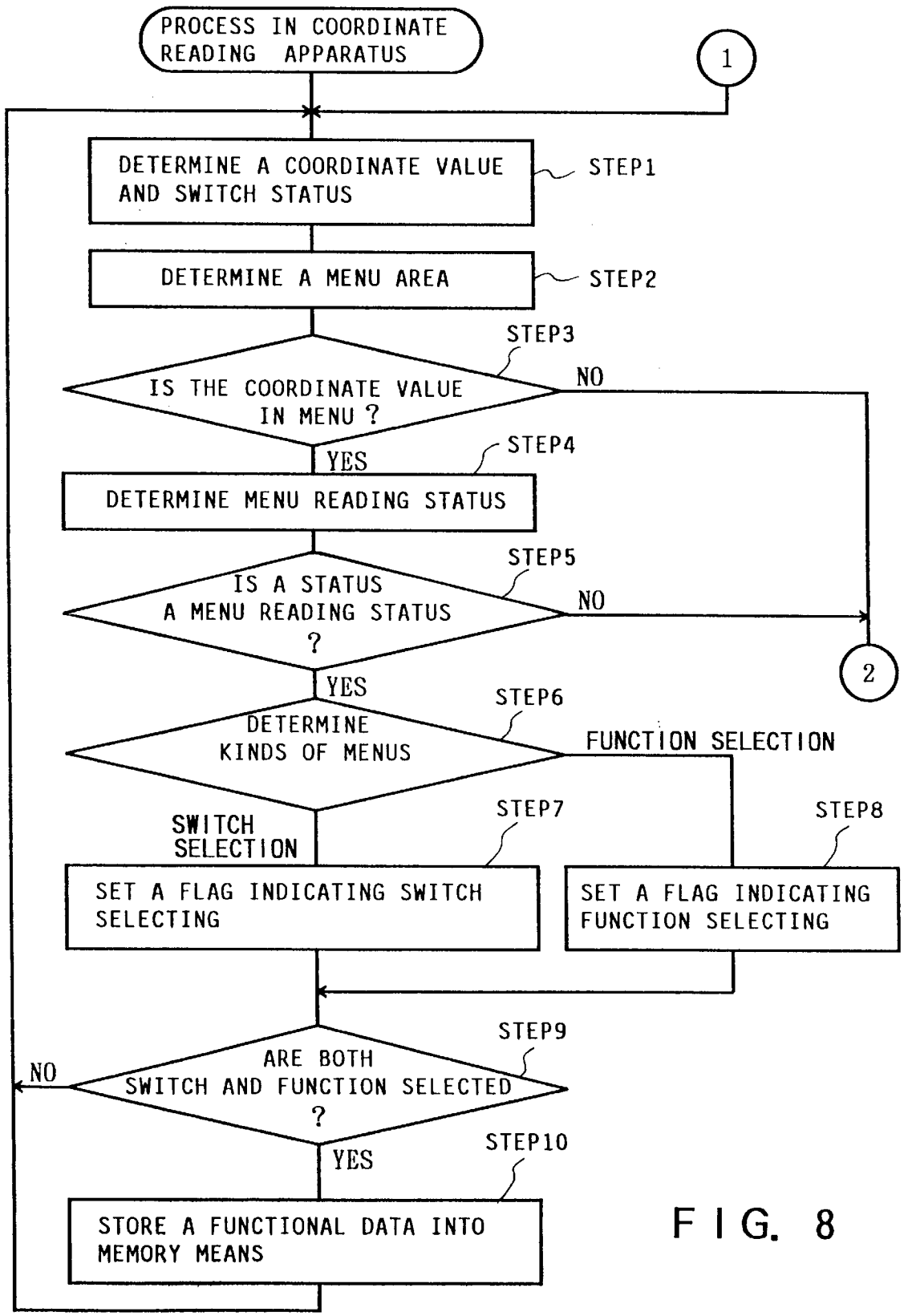
FIG. 8 is a flowchart of internal processes according to the first example of the coordinate reading apparatus according to the present invention.
Figure 9:
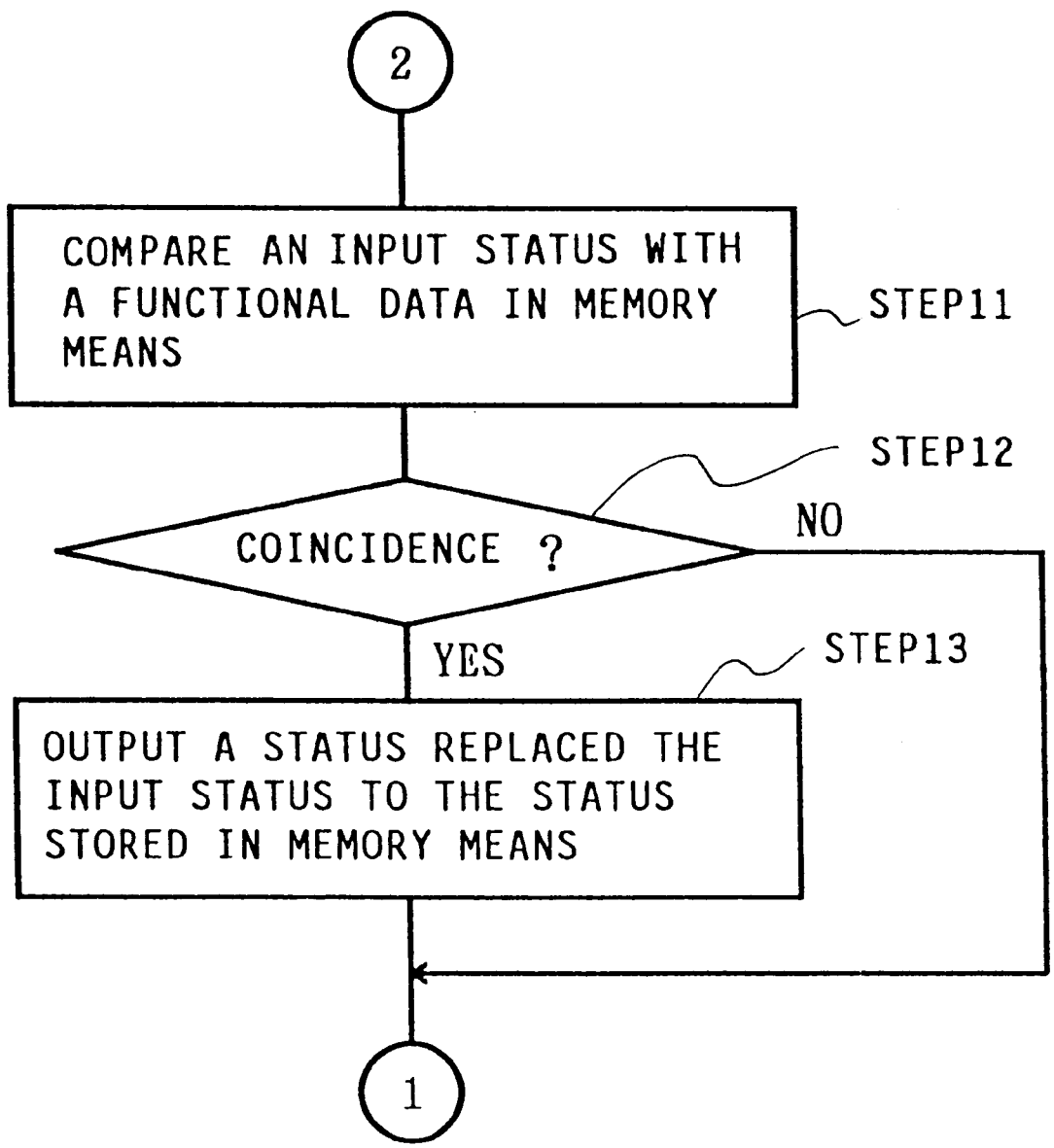
FIG. 9 is a flowchart of internal processes according to the first example of the coordinate reading apparatus according to the present invention.

Although, in the coordinate reading apparatus explained in the above-described embodiments of the present invention, the coordinate indicator has two switches, the present invention is feasible for a coordinate reading apparatus structured with a plurality of switches of greater number. FIG. 6 is a block diagram of a first example of such a coordinate reading apparatus, FIG. 7 is an explanatory diagram of a menu, FIG. 8 and FIG. 9 are flow charts of the processes.

A coordinate indicator 3a of the present example has four switches. In the figure, these switches are switches 32a, 331, 332, and 333. These switches may be functionally categorized into two groups. The switch 32a is a switch for menu pointing, which is used to point the menu. The switches 331 to 333 are to be a switch 2, a switch 3, and a switch 4, and these are to be referred to as "other" switches. Other structure except for the coordinate indicator 3a is the same as the structure explained in the first embodiment of the invention. However, there are differences in respect of operation so that such points will be explained in explanation on the operation.

Figure 7:
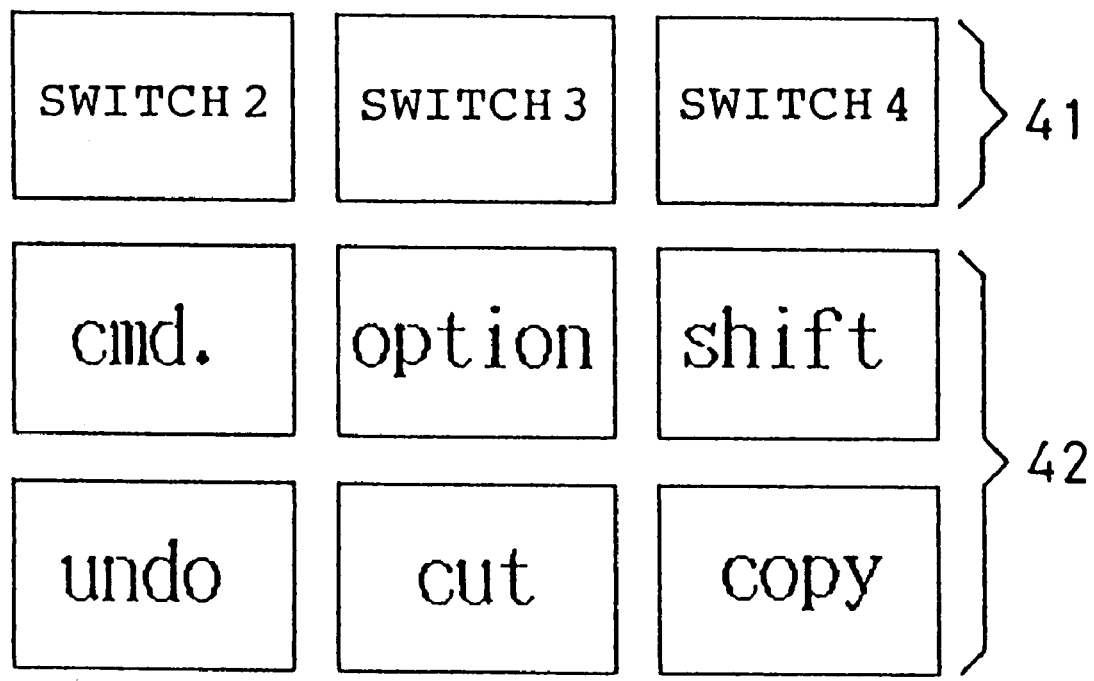
FIG. 7 is a detailed explanatory diagram of a menu according to the first example of the coordinate reading apparatus according to the present invention.

FIG. 7 is an explanatory diagram of a menu employed in the present example. A menu 4a is provided with a "switch selection menu" 41 and a "function selection menu" 42. Among them, the "function selection menu" 42 is the same as the structure explained in the first embodiment of the invention. In the present example, the "switch selection menu" 41 is newly provided. The "switch selection menu" 41 is for selecting the other switches 331 to 333.

In the present example, by pointing to the menu 4a using the menu-pointing switch 32a, the plurality of other switches 331 to 333 are selected and the selected switches are assigned with a function selected by the menu 4a. Then, the operation of the present example will be explained based on a flowchart of FIG. 8 and FIG. 9.

(1) The operation of assigning function to the switch by the menu

First at a step 1, a coordinate value for a position at which the coordinate indicator 3a points and a switch status are determined. Then at a step 2, determination is made whether the coordinate value is included in a menu region or not, and based on this determination result the process is branched at a step 3. Where determined to be within the range, it proceeds to a next step 4, while where determined to be out of the menu, it branches to a step 11.

Where determined within the menu, at the next step 4 it is determined whether the switch status is a status determined for menu reading. In the present example, since there is provided the menu-pointing switch 32a exclusively for menu reading, the status is determined based on this switch. Based on the result determined at the step 4, the process is branched at a step 5. Where it is detected that the switch status of the menu-pointing switch 32a is turned from off to on, it proceeds to a next step 6, while in otherwise cases it branches to the step 11.

Then at the step 6, the process is branched depending on whether the read menu item is a switch selection menu or a function selection menu. Where the switch selection menu, a flag representing that the switch is selected is set at a step 7, and it proceeds to a step 9. Similarly, where the function selection menu, a flag representing it is set at the step 8, and it proceeds to the step 9. At the step 9, determination is made whether or not a switch is selected and a function is selected, and the process is branched depending on this result.

The above processes are processes for menu analysis. Where it is determined that the switch is selected and the function is selected, at a next step 10 the function data assigned to the read menu is stored in the memory means 23a. The processes from the step 2 to the step 10 correspond to the processes of the function selecting means 22a.

The data to be stored in the memory means 26 is, as already explained, functional data in a pair of "status pattern to be converted" and "data to be outputted". FIG. 10 shows a data configuration of the functional data in the present example. The memory regions have in pair form a region for storing the "status pattern to be converted" and a region for storing the "data to be outputted", so that there are a plurality of pairs corresponding to the number of the switches. FIG. 10 shows an example of the functional data stored. In the "status pattern to be converted" of a memory region 1 is stored the pattern of "turning of switch 2 from off→on", and in the "data to be outputted" of the memory region is stored "key-code "cmd."". This content represents that key-code "cmd." should be outputted when the status of the switch 2 is turned from off to on. In other regions also, functional data are similarly stored. Although in the FIG. 10 example the order of the switches stored is not arranged in order of the switch number, this is because the order of function setting is performed in the order of the switch 2, the switch 4, and the switch 3 and configuration is made to store in the same order. There is no problem in this order of storage.

Incidentally, in also the present example the steps 2, 3 and the steps 4, 5 may be replaced in order. These four steps are the processes for menu analysis, wherein determination is made whether the condition of coordinate value and the condition of switch are both met or not. The steps 4, 5 may be first executed and thereafter the steps 2, 3 be executed.

Also, although explanation was made on the assumption that the determination of menu region at the step 2 and the determination of menu kind are separately made, it is also possible to simultaneously perform the processing as to determination of menu region of this section. The processing of menu analysis is to determine a region and to determine a switch status, being regardless of the order. Also, there is, as a particular example, a case where the determination of menu is carried out by only the coordinate value.

(2) status converting operation during coordinate reading

Where determination is not menu reading at the step 3 or the step 5 in the flowchart of FIG. 8 or FIG. 9, it branches to the step 11. At the step 11, comparison is made of a switch status inputted from the coordinate detecting section 21 and the "status pattern to be converted" among the functional data stored in the memory means 23a, to determine whether coincident with or not. Based on this determination result, the process is branched at a step 12. Where the inputted switch status coincides with the "status pattern to be converted" stored in the memory region, it proceeds to a step 13, whereas in otherwise cases the process of the step 13 is skipped. The above processing of the step 11 and the step 12 corresponds to the processing of the conversion status determining means 24a.

Where the inputted switch status coincides with the "status pattern to be converted" stored in the memory region, at the step 13 the "data to be outputted" stored in the memory means 23a is outputted instead of the inputted switch status. Where the inputted switch status does not coincide with the "status pattern to be converted", although not shown, the inputted switch status is outputted as it is without conversion. The above processing of the step 13 corresponds to the processing of the conversion status output means 25a.

As explained above, the present example has realized the coordinate reading apparatus according to the present invention, in a coordinate reading apparatus possessing a coordinate indicator including a plurality of switches, by making the function to be set in the switch to be selected by means of the switch selecting menu and the function selecting menu.

Coordinate Reading Apparatus: Second Example

The above first example is arranged to reading a menu by means of an exclusive menu pointing switch for setting functions to the other switches. Instead of providing an exclusive menu-pointing switch in this manner, the present invention can be practiced by directly reading a menu with a switch to which the functions are to be set. A second example explained hereinbelow is structured in this manner.

The structure of this second example may be the same as the structure of the first example shown in FIG. 6, being realized by modifying the function of part of constituent means. In the present example, the functions for a plurality of switches are set using the same menu as shown in FIG. 4. The flowchart for processing is the same as FIG. 3, part of which function is modified.

At the step 4 of the FIG. 3, the status determination for menu reading performs only determination of a status pattern and there is no selection of a functional setting switch as in the first example, so that no determination is made for the kind thereof. Of course, the detection of which switch is operated is carried out. When storing a selected functional data in the memory means at the step 6, a functional data selected is stored similarly to the first example together with the kind of the switch by which the menu is read. The structure of the functional data thus stored also becomes the same as the first example. The operation of status conversion during coordinate reading is also the same as the first example.

The operation is shown in detail by way of an example. For example, it is assumed that the function is set to the switch 2 of the coordinate indicator 3a shown in FIG. 6. To do this, in the present example the switch 2 directly reads a menu. For example, it is assumed that the menu "cmd." in FIG. 4 is read. At the step 1 of the FIG. 3 flowchart, first a coordinate value for the read point and a status of the switch 2 are determined. This coordinate value is determined to be within the menu at the step 2 and the step 3, and subsequently at the step 4 and the step 5 determination is made that the status has become a pattern determined for menu reading, i.e., turning from off to on. In the present example, since the switch for menu reading is arbitrary, a switch operated is set with a desired function. That is, although which switch has been operated is detected, there is no selection of a separate switch to specify that the function is set in a specified switch, without requiring determination of the kind thereof. Subsequently at the step 6 the functional data, that is, "turning of switch 2 from off to on" as the "status pattern to be converted" and "key-code "cmd." of keyboard" as the "data to be outputted" are stored in the memory means. Thereafter, where the switch 2 reads out of the menu, the data stored as "data to be outputted" of the functional data is outputted in place of the status of the switch 2.

Coordinate Reading Apparatus: Third Example

Figure 11:
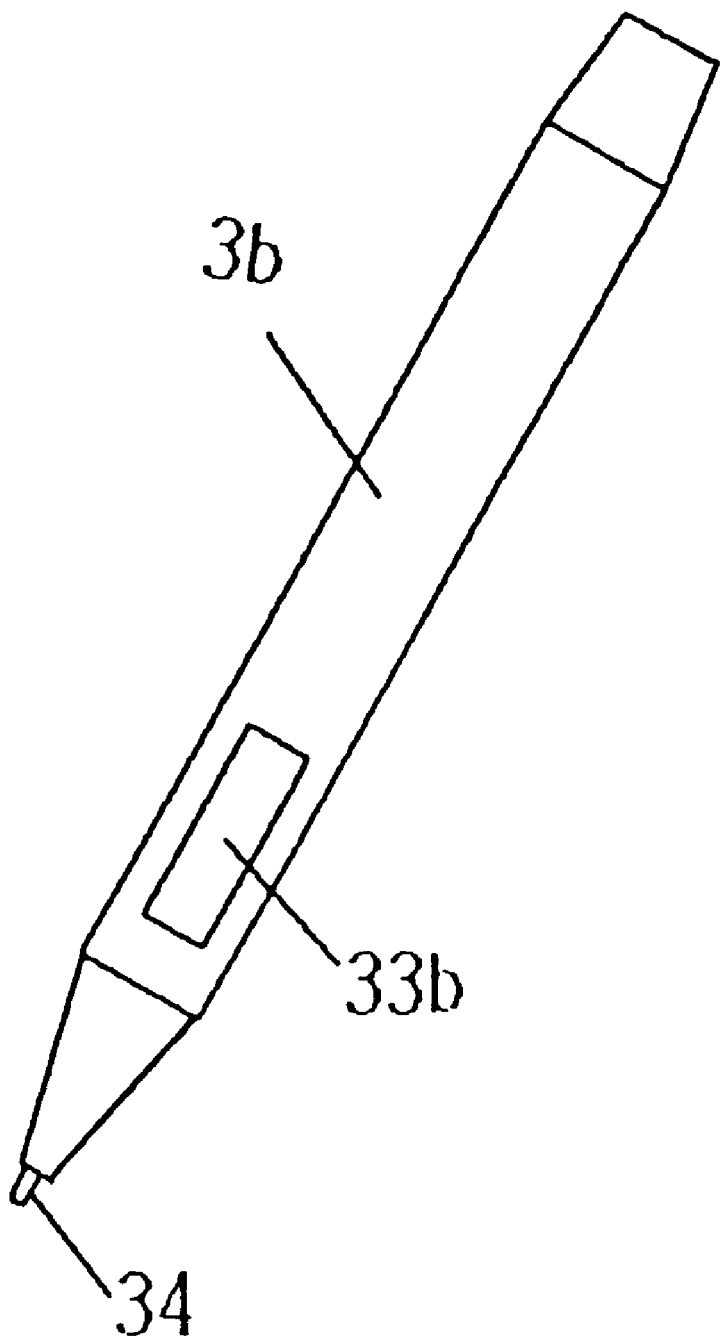
FIG. 11 is an external appearance view of a stylus pen according to a third example of the coordinate reading apparatus according to the present invention.

Then explanation will be made on a third example as to a coordinate reading apparatus employing a stylus pen as a coordinate indicator. As shown in FIG. 11, the stylus pen 3b is a coordinate indicator in a pen shape and has at a tip a core 34 similar to a writing instrument, which possesses a switch (not shown) called pen switch which is turned on/off by operation of pressing the core in, and a side switch provided on a side surface of a pen shaft to be turned on/off by depression with a finger. The side switch in general is single, but may be provided plurality in number.

The present example assigns a function to the side switch by reading a menu with a pen switch 32b. If there is one side switch as shown in FIG. 11, it is possible to realize by the structure explained in the above stated embodiment. Also, where the side switch is provided in plurality in number, it is possible to realize by the structure of the above stated first example. The present example is an example which seems to be most generally used among the aforesaid structures already explained.

Interface Unit and Coordinate Reading System

The similar structures to the above first to third examples concerned with the above coordinate reading apparatus can be practiced as to an interface unit and a coordinate reading apparatus using the same interface unit. That is, (1) as in the above first example, a structure of an interface unit and a coordinate reading apparatus connected with this interface unit wherein a coordinate reading apparatus having a coordinate indicator with a plurality of switches is connected, and a menu is read by a menu-pointing switch to assign other switches with functions so that, when reading is made by the other switches, the switch status is converted and outputted in accordance with the assigned function.

(2) as in the second example, a structure of an interface unit and a coordinate reading apparatus connected with this interface unit wherein a coordinate reading apparatus having a coordinate indicator with a plurality of switches is connected, and a menu is directly read by a switch to be set with a function to assign the same switch with the function so that, when other regions than the menu are read by the switch, the switch status is converted and outputted in accordance with the assigned function.

(3) a structure of an interface unit and a coordinate reading apparatus connected with this interface unit wherein a coordinate reading apparatus having a coordinate indicator with a pen switch and a side switch is connected, and a menu is read by a pen switch to assign the side switch with the function so that, when reading is made by the side switch, the switch status is converted and outputted in accordance with the assigned function.

These are possible to practice.

Coordinate Reading System: Fourth Embodiment

Figure 14:
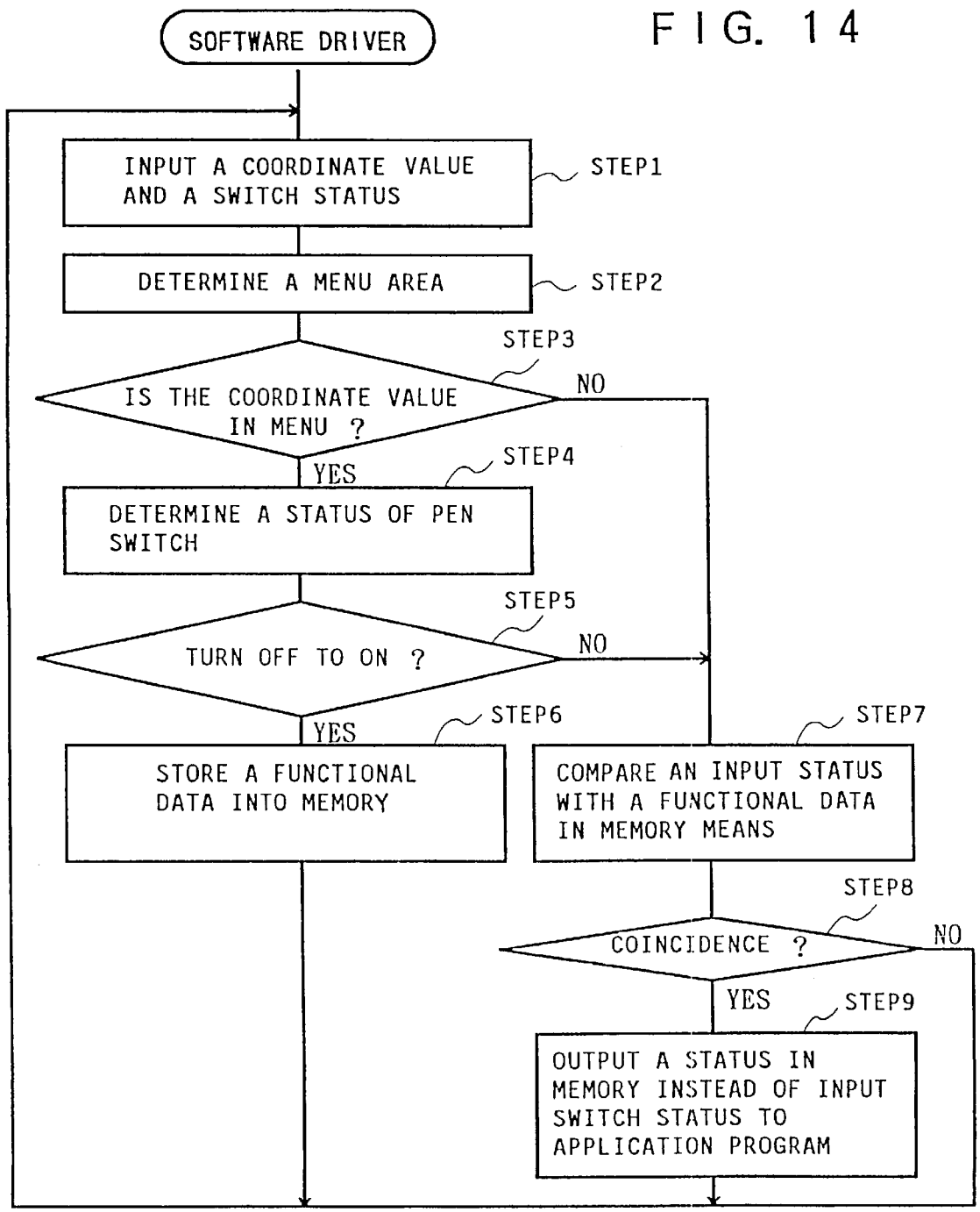
FIG. 14 is a flowchart of a software driver according to the fourth example of the coordinate reading system according to the present invention.

Amongst the above structures (1) to (3), a coordinate reading system according to the structure (3) will be explained as a fourth embodiment. In the present example, it is assumed that the side switch for the stylus pen is one and the reading of a menu by the pen switch provides assignment of a function for the read menu to the side switch. Explanation is made on the assumption that the interface unit is not provided as an independent hardware and the function as the interface unit is structured as a software driver. FIG. 12 is a block diagram of the coordinate reading system structured alike this, FIG. 13 is a program configuration diagram for an information processing unit, and FIG. 14 is a flowchart of a software driver which performs a function as an interface unit.

As shown in FIG. 12, the structure as hardware has a coordinate reading apparatus 5 connected to a computer 71 as an information processing unit. The coordinate reading apparatus 5 comprises a tablet 51 and a stylus pen 53, wherein the stylus pen 53 has a pen switch 531 and a side switch 532. On the tablet 51 of the coordinate reading apparatus 5, the menu shown in FIG. 2 is being displayed. A hardware interface between the coordinate reading apparatus 5 and the computer 71 uses an exclusive interface such as a standard serial interface conforming to RS232C, or an ADB interface where connected to a computer alike Macintosh of US Apple Computer, Inc.

The actual function effected as an interface unit and a coordinate reading apparatus is control processing by a computer program stored, for instance, on a disk 72. FIG. 13 is a conceptual diagram of the computer program. As in the figure, the program involves an operating system 74 (hereinafter referred to as OS) as a basic program, on which an application program operates. The application program 73 involves one such as CAD for example which does design assistance by reading a drawing with a coordinate reading apparatus or pointing on-display positions. The software driver 75 is built in so as to form part of the OS above 74, executing the function according to the present invention.

Then the software driver 75 will be explained on its operation based on a flowchart of FIG. 14.

(1) The operation of assigning functions to the side switch by the menu

First at a step 1, a coordinate value indicated by the stylus pen 53 and a switch status are inputted from the coordinate reading apparatus 5. Then at a step 2, determination is made whether the inputted coordinate value is included in a menu region or not, to branch the process at a step 3 based depending on the determination result. Where determined to be within the menu, it proceeds to a next step 4, while where determined not within the menu, it branches to a step 7.

Where determined within the menu, at the next step 4 determination is made whether the status of the switch pen is turned from off to on or not. Based on the result determined at the step 4, the process is branched at a step 5. Where detected that the pen-switch status is turned from off to on, it proceeds to a next step 6, whereas in otherwise cases it branches to the step 7.

In the above stated processing, where determined that a menu is read, at the next step 6 the functional data assigned to the read menu is stored in a memory of the computer 71. This memory for example corresponds to the memory means 63 of the interface unit shown in FIG. 5. The data stored in the memory is, as already explained, the functional data in the pair of the "status pattern to be converted" and the "data to be outputted".

Here, it is assumed that "double click" in the menu shown as an example in FIG. 2 be read. The function assigned to this "double click" menu is a function that turning on of the side switch once provides an output of a status pattern of off→on→off→on as pen-switch status. In this case the memory memorizes "turning of side switch from off to on" as "status pattern to be converted" and "pattern of off→on→off→on of pen-switch status" as "data to be outputted".

(2) The operation of status conversion during coordinate reading

At the step 3 or the step 5 in the flowchart of FIG. 14, where the condition of menu reading is not fulfilled, it branches to the step 7. At the step 7, comparison is made between the switch status inputted from the coordinate reading apparatus 5 and the "status pattern to be converted" among the functional data stored in the memory. Now, the "status pattern to be converted" is the "turning of side switch from off to on". At the step 7, whenever a new switch status is inputted, monitoring is made whether this status is for the side switch and turning has been done from off to on or not. Based on the result determined at the step 7 in this manner, the process is branched at a step 8. Where determined, in switch status, that the side switch is determined to be turned from off to on, it proceeds to a next step 9, while in other cases the process of the step 9 is skipped.

Where it is determined that the side switch is turned from off to on, at the step 9 the "pattern of off→on→off→on of pen-switch status" stored in the memory is outputted to the application program 73 instead of the inputted switch status. Thus, for the application program 73, the status same as the case of double clicking the pen switch is inputted.

In the above explanation, explanation has been made on the example that the function of the menu "double click" is assigned to the switch, which is similarly true for other menus. The functional data read by the side switch is stored in the memory, and where the side switch is operated to goes to coincidence with the condition of the functional data, the status of the side switch is replaced by the data to be outputted in the functional data, for being outputted to the application program.

If a software driver alike this is used, the operation of the coordinate reading system can be improved as follows. For example, as explained in the prior art, if the menu "double click" is assigned to the side switch in a coordinate reading system comprising a computer adopting a image-user interface, the operation of opening a file is achieved by once depressing the side switch without requiring actual double clicking by the pen switch. Also, if a function "option" has been assigned, the operation of copying or moving a file is achieved by either one operation only of dragging with the side switch depressed or dragging without depression, without requiring keyboard operations. Furthermore, the operation of assigning these functions to the side switch requires only menu reading by the pen switch, and there is no necessity opening a set-up program on the display as conventional.

The software driver is not annexed to an OS or an application program, but it is general practice to be supplied from an enterprise of supplying coordinate reading apparatuses. The supply of same is through distribution of memorized mediums such as floppy disks for example. Where architecting a coordinate reading system, there is necessity of "install" from a memory medium alike this to a computer. For the sake of installing, exclusive install programs have recently being supplied at the same time, so that installing has being automatically made by execution of this program. The supply of software drivers is possible by means of various memory mediums other than this or telecommunication media such as personal-computer communication, internet, etc.

Other Examples of Coordinate Reading Apparatus

Although the above second embodiment of the coordinate reading apparatus is structured to use two kind of menus, the menus may of course be a plurality of kind of three or more. Selection maybe satisfactory by increasing the number f menus, etc.

Also, in the above second embodiment, although the selection menu A 43 and the selection menu B 45 are arranged so as to be at different locations to each other on the tablet, they may be placed at a same location to be selected based on the switch status upon being indicated by the coordinate indicator. For example, it is assumed that a stylus pen, as a coordinate indicator, having a pen switch and a side switch is used with using a menu sheet as shown in FIG. 18. As in the figure, the selection menu 43*a* is placed at a same location on a menu sheet A 45*a* and a menu sheet B 46*a*. Here, when selecting the selection menu A 43*a*, a pen switch 32*b* is depressed to indicate, whereas when selecting the menu sheet B 46*a* a side switch 33*b* is depressed while indicating the selection menu 43*a*. In this case, the coordinate reading apparatus acknowledges that this operation is a menu-selecting operation from a position indicated, and further distinguishes from a switch status being indicated which menu is to be selected.

Furthermore, by applying the function of this menu selection to an aspect of using, it is also possible to select to use a plurality of sets of menus indicated on one menu sheet. For example, as shown in FIG. 19, on one menu sheet 45*b* are displayed two groups, i.e., a menu A 4*e* as a group A and a menu B 4*f* as a group B. And, these are used by selecting with a selection menu 43*a*. The method of how to select the menu may adopt a method already explained. To select by the one selection menu 43*a* as in FIG. 19, distinguishing is done by the switch status as stated above.

As stated above, it is clear that the structure of selecting to use a plurality of menus is not limited to the coordinate reading apparatus but similarly applicable to the status converting method for the coordinate reading apparatus according to the present application, the interface unit for the coordinate reading apparatus, and further the coordinate reading system.

As described above, in the present invention, in a coordinate reading apparatus constituted by a tablet and a coordinate indicator having a plurality of switches, the tablet being provided with a menu assigned with a function to be set to said switch, a switch function setting means for setting the function assigned to said menu to said switch by indicating said menu with said coordinator indicator and operating a predetermined switch, a switch status converting means for converting and outputting the status of said switch in accordance with the function set by said switch function setting means, thereby structuring a coordinate reading apparatus.

Also, in the above-structured coordinate reading apparatus, to the switch function setting means are provided a function selecting means for determining that the read coordinate value and the switch status become a predetermined state corresponding to menu reading to select functional data corresponding to the read menu, and a memory means for storing the selected functional data, while to the status converting means are provided a conversion status determining means for determining that the status pattern of an operated switch coincides with the status pattern to be converted of the functional data, and a conversion status output means for outputting data to be outputted of the functional data when determined coincident, thereby constituting a coordinate reading apparatus.

Furthermore in the present invention, a status converting method for a coordinate reading apparatus is structured, wherein a coordinate reading apparatus, having a coordinate indicator having a plurality of switches and a tablet provided with a menu assigned with a function to be set to said switch, is connected to an information processing unit for performing predetermined processing, the status converting method for a coordinate reading apparatus being constituted by providing the process of determining that the position indicated by the coordinate indicator and the switch status become a predetermined state corresponding to menu reading to select functional data corresponding to the read menu, and the process of storing the functional data selected.

Also, a status converting method for a coordinate reading apparatus is structured by further providing, to the above-structured status converting method, the process of determining that the status pattern of an operated switch coincides with the status pattern to be converted of the functional data, and the process of outputting data to be outputted when coincident.

Furthermore in the present invention, in a coordinate reading system having a coordinate reading apparatus, which is constituted by a coordinate indicator having a plurality of switches and a tablet provided with a menu assigned with a function to be set to said switches, connected to an information processing unit, an interface unit for a coordinate reading apparatus was structured by providing to an interface unit connected between the coordinate reading apparatus and the information processing unit, a function selecting means for determining that the position indicated by the coordinate indicator and the switch status has become a predetermined state corresponding to menu reading to select functional data corresponding to the read menu, a memory means for storing the functional data selected, a conversion status determining means for determining that the operated switch coincides with the switch status pattern corresponding to the functional data stored in the memory means, and a conversion status output means for outputting data to be outputted of the functional data when coincidence is determined.

Furthermore, in the present invention, the aforesaid interface unit is connected between the coordinate reading apparatus and the information processing unit, to structure a coordinate reading system having a function of the aforesaid interface unit.

According to the coordinate reading apparatus or the status converting method for a coordinate reading apparatus or the interface unit for a coordinate reading apparatus structured alike this, a function can be set to the switch provided on the coordinate indicator by reading a menu provided on the tablet with the coordinate indicator, while, where reading other than the menu, the status can be converted in accordance with the function being set. In particular, the operation of setting a function to the switch can be performed only by read operation with the coordinate reading apparatus, making possible to structure a coordinate system without requiring operation of other devices such as a keyboard.

Therefore, the following effects are available by the present invention.

(1) Possible to realize a coordinate reading apparatus which is capable of easily setting a particular function to a switch provided on a coordinate indicator, and an interface unit for the coordinate reading apparatus, and a coordinate reading system.

(2) Possible to realize a coordinate reading apparatus which is capable of setting a particular function to a switch provided on a coordinate indicator only by operation on the coordinate reading apparatus without operating a computer, etc., and an interface unit for the coordinate reading apparatus, and a coordinate reading system.

What is claimed is:

1. In a coordinate reading apparatus having a tablet and a coordinate indicator provided with a plurality of switches to output a coordinate value of a position pointed to by the coordinate indicator, the coordinate reading apparatus comprising:

the tablet comprising a coordinate reading surface provided with a plurality of positions that may be pointed to by the coordinate indicator, and a menu portion provided with at least one selectable menu item for designating a function to be assigned to a selected switch so that operation of the respective switch causes the function to occur;

a switch function setting means for assigning the function designated by a selectable menu item to a selected switch in response to pointing to the selectable menu item with the coordinate indicator and operation of a predetermined menu pointing switch located on the coordinate indicator; and switch status converting means for converting an output of the switch function setting means into functional data necessary to perform the assigned function.

2. In a coordinate reading apparatus having a tablet and a coordinate indicator provided with a plurality of switches to output a coordinate value of a position pointed to by the coordinate indicator, the coordinate reading apparatus comprising:

the tablet comprising a coordinate reading surface provided with a plurality of positions that may be pointed to by the coordinate indicator, and a menu portion provided with at least one selectable menu item for designating a function to be assigned to a selected programmable switch;

switch function setting means for assigning the function designated by a selectable menu item to a selected switch in response to pointing to the selectable menu item with the coordinate indicator and operating a predetermined menu pointing switch located on the coordinate indicator, the switch function setting means comprising function selecting means for distinguishing that the coordinate value of a position pointed to by the coordinate indicator is included in a region of the menu portion at which a respective selectable menu item is located, determining that the menu pointing switch has become a predetermined state corresponding to menu reading, and selecting functional data that is to be output upon operation of the selected switch and switch status data representing a status of the selected switch necessary to perform the function assigned thereto; and a memory for storing the functional data and the switch status data selected by the function selecting means; and switch status converting means for converting an output of a selected switch having a function assigned thereto into functional data in accordance with the function assigned by the switch function setting means, the switch status converting means comprising conversion status determining means for determining that the status of an status data stored in the memory; and conversion status output means for outputting the functional data necessary to perform the assigned function corresponding to the switch status data when coincidence of the status of the operated switch and the switch status data is determined by the conversion status determining means.

3. In a coordinate reading apparatus having a tablet and a coordinate indicator provided with a plurality of switches to output a coordinate value of a position pointed to by the coordinate indicator, the coordinate reading apparatus comprising:

the plurality of switches comprising a menu-pointing switch and at least one programmable switch;

the tablet having a coordinate reading surface provided with a plurality of positions that may be pointed to by the coordinate indicator, and a menu portion provided with at least one first selectable menu item for selecting a respective programmable switch and a plurality of second selectable menu items each for designating a respective function to be assigned to a selected programmable switch;

switch function setting means for assigning a function designated by a respective second selectable menu item to a selected programmable switch in response to pointing to a second selectable menu item with the coordinate indicator and operating the menu-pointing switch; and switch status converting means for converting an output of a programmable switch having a function assigned thereto by the switch function setting means into functional data necessary to perform the function.

4. In a coordinate reading apparatus having a tablet and a coordinate indicator provided with a plurality of switches to output a coordinate value of a position pointed to by the coordinate indicator, the coordinate reading apparatus comprising:

the plurality of switches comprising a menu-pointing switch and at least one programmable switch;

the tablet having a coordinate reading surface provided with a plurality of positions that may be pointed to by the coordinate indicator, and a menu portion provided with at least one first selectable menu item for selecting a respective programmable switch and at least one second selectable menu item for designating a function to be assigned to a selected programmable switch;

switch function setting means for assigning a function to a selected programmable switch in response to pointing to a second selectable menu item with the coordinate indicator and operating the menu-pointing switch, the switch function setting means comprising switch selecting means for distinguishing that the coordinate value of a the position pointed to by the coordinate indicator is included in a range of the menu at which a first selectable menu item is located for selecting a respective programmable switch and determining that the menu-pointing switch has become a predetermined state corresponding to menu reading, to select the respective programmable switch designated by the indicated first selectable menu item; function selecting means for distinguishing that the coordinate value of a position pointed to by the coordinate indicator is included in a range of the menu at which a second selectable menu item is located, determining that the menu-pointing switch has become a predetermined state corresponding to menu reading, and selecting data including functional data that is output upon operation of a selected programmable switch to perform the function designated by a selected second selectable menu item and switch status data representing a status of the selected programmable switch necessary to perform the function assigned thereto; and a memory for storing the switch status data selected by the function selecting means and the functional data selected by the function selecting means; and switch status converting means for outputting data representing the status of the switches and converting an output of a respective programmable switch having a function assigned thereto into functional data in accordance with the function set by the switch function setting means, the switch status converting means comprising conversion status determining means for determining that an operated programmable switch is a switch corresponding to the functional data stored in the memory and determining that the status of the operated programmable switch coincides with the switch status data stored in the memory; conversion status output means for outputting data necessary to perform the function when it is determined that the status of the operated programmable switch coincides with the switch status data stored in the memory.

5. In a coordinate reading apparatus having a tablet and a coordinate indicator provided with a plurality of switches to output a coordinate value of a position pointed to by the coordinate indicator, the coordinate reading apparatus comprising:

the tablet comprising a coordinate reading surface provided with a plurality of positions that may be pointed to by the coordinate indicator, and a menu portion provided with a plurality of first selectable menu items each for selecting a respective switch and at least one second selectable menu item for designating a function to be assigned to a selected switch;

switch function setting means for setting the function designated by a second selectable menu item to a selected switch in response to pointing to the second selectable menu item with the coordinate indicator and operation of a predetermined menu pointing switch on the coordinate indicator; and switch status converting means for outputting data representing the status of the switches and converting an output of a selected switch into functional data necessary to perform a function in accordance with the function assigned thereto the switch function setting means.

6. In a coordinate reading apparatus having by a tablet and a coordinate indicator provided with a plurality of switches, including at least one programmable switch, to output a coordinate value of a position indicated by the coordinate indicator, the coordinate reading apparatus comprising:

the tablet having a coordinate reading surface provided with a plurality of positions that may be pointed to by the coordinate indicator, and a menu portion provided with at least one first selectable menu item for selecting a respective programmable switch and at least one second selectable menu item for designating a function to be assigned to a selected programmable switch;

switch function setting means for assigning the function designated by a second selectable menu item to a selected programmable switch in response to pointing to the second selectable menu item with the coordinate indicator and operating the selected programmable switch, the switch function setting means comprising function selecting means for distinguishing that the coordinate value of a position pointed to by the coordinate indicator is included in a range of the menu at which a second selectable menu item is located, determining that the programmable switch to be set with the function has become a predetermined state corresponding to menu reading, and selecting functional data that is to be output upon operation of the selected programmable switch to perform the function designated by the selected second selectable menu item and switch status data representing a status of the selected programmable switch necessary to perform the function assigned thereto; and a memory for storing the switch status data and the functional data selected by the function selecting means; and switch status converting means for converting an output of a respective switch having a function assigned thereto by the switch function setting means, the switch status converting means comprising conversion status determining means for determining that an operated switch is a switch corresponding to the functional data stored in the memory and further determining that the status of the operated switch coincides with the switch status data stored in the memory; and conversion status output means for outputting the functional data necessary to perform the assigned function corresponding to the switch status data when it is determined that the status of the operated switch and the switch status data coincide by the conversion status determining means.

7. In a coordinate reading apparatus having a tablet and a pen-shaped stylus pen type coordinate indicator provided with a plurality of switches to output a coordinate value of a position pointed to by the stylus pen, the coordinate reading apparatus comprising:

the stylus pen type coordinate indicator comprising an outer tubular shaft having an opening formed at one end, an inner core having a nib portion, the inner core disposed to undergo axial movement within the shaft so that the nib portion is selectively extendable through the opening formed at one end of the shaft, and a plurality of switches, including a pen switch mounted to the coordinate indicator to undergo axial movement in conjunction with the axial movement of the inner core so that the pen switch is turned on when the nib portion is extended through the opening and is turned off when the nib portion is retracted within the shaft, and a side switch mounted on the tubular shaft;

the tablet having a coordinate reading surface provided with a plurality of positions that may be pointed to by the nib portion of the stylus pen, and a menu portion provided with at least one selectable menu item for designating a function to be assigned to the side switch;

switch function setting means for setting the function designated by a selectable menu item to the side switch in response to pointing to the selectable menu item with the coordinate indicator and the turning on the pen switch; and switch status converting means for converting the status of the side switch to functional data necessary to perform the function assigned to the side switch in accordance with the function set by the switch function setting means.

8. In a coordinate reading apparatus having a tablet and a pen-shaped stylus pen type coordinate indicator provided with a plurality of switches to output a coordinate value of a position pointed to by the stylus pen, the coordinate reading apparatus comprising:

the stylus pen type coordinate indicator comprising an outer tubular shaft having an opening formed at one end, an inner core having a nib portion, the inner core disposed to undergo axial movement within the shaft so that the nib portion is selectively extendable through the opening formed at one end of the shaft, and a plurality of switches, including a pen switch mounted to the coordinate indicator to undergo axial movement in conjunction with the axial movement of the inner core so that the pen switch is turned on when the nib portion is extended through the opening and is turned off when the nib portion is retracted within the shaft, and a side switch mounted on the tubular shaft;

the tablet having a coordinate reading surface provided with a plurality of positions that may be pointed to by the nib portion of the stylus pen, and a menu portion provided with at least one selectable menu item for designating a function to be assigned to the side switch;

switch function setting means for setting the function designated by a selectable menu item to the side switch in response to pointing to the selectable menu item with the coordinate indicator and turning on the pen switch, the switch function setting means comprising function selecting means for distinguishing that the coordinate value of a position pointed to by the stylus pen is included in a region of the menu at which the selectable menu item is located, determining that the pen switch has become a predetermined state corresponding to menu reading, and selecting functional data that is to be output to perform the function designated by the selectable menu item when the side switch is operated and switch status data representing a status of the side switch necessary to perform the function assigned to thereto; and a memory for storing the functional data and the switch status data selected by the function selecting means; and switch status converting means for converting an output of the side switch in accordance with the function assigned thereto by the switch function setting means, the switch status converting means comprising conversion status determining means for determining that the data representing the status of the operated side switch coincides with the switch status data stored in the memory; and conversion status output means for outputting the functional data corresponding to the switch status data when coincidence of the status of the operated side switch and the switch status data is determined by the conversion status determining means.

9. A coordinate reading apparatus as recited in claim 1; wherein the tablet is provided with a plurality of menu regions each having at least one first selectable menu item for assigning a function to a respective switch on the coordinate indicator and a second selectable menu item associated with each menu region for selecting the corresponding menu region; and further comprising menu selecting means for selecting one of the plurality of menu regions in response to pointing to a second selectable menu item with the coordinate indicator and operating a predetermined switch.

10. A coordinate reading apparatus as recited in claim 1; wherein the coordinate reading surface is receptive of a plurality of different menu sheets each displaying thereon a menu comprising at least one first selectable menu item for designating a function to be assigned to a switch and a second selectable menu item for selecting the corresponding menu; and further comprising menu selecting means for selecting a menu displayed on one of the plurality of menu sheets in response to pointing to a second selectable menu item associated with a menu sheet with the coordinate indicator and operating a predetermined switch.

11. A coordinate reading apparatus as recited in claim 1; wherein the menu portion comprises a plurality of separate menus each being displayed on a separate menu sheet mountable on the coordinate reading surface and each displaying by grouping a plurality of first selectable menu items each designating a function to be assigned to a selected switch on the coordinate indicator and a second selectable menu item for selecting a corresponding menu; and menu selecting means for selecting one of the plurality of menus in response to pointing to a second selectable menu item with the coordinate indicator and operating a predetermined switch.

12. A coordinate reading apparatus as recited in claim 1; wherein the function designated by the at least one selectable menu item comprises the outputting of one or more keyboard codes so that operation of a selected switch having a function assigned thereto results in the outputting of the one or more keyboard codes.

13. A coordinate reading apparatus as recited in claim 1; wherein the menu portion comprises a plurality of separate menus, each being displayed on a separate menu sheet mountable on the coordinate reading surface, each menu sheet having at least one first selectable menu item for designating one or more keyboard codes to be assigned to a switch and a second selectable menu item for selecting a corresponding menu; and further comprising menu selecting means for selecting one of the plurality of menus in response to pointing to a corresponding second selectable menu item with the coordinate indicator and operating a predetermined switch.

14. A coordinate reading apparatus as recited in claim 1; wherein the menu portion comprises a plurality of separate menus, each being displayed on a separate sheet mountable on the coordinate reading surface and each for designating one or more selectable keyboard codes which may be assigned to a selected switch and a menu selecting item for selecting a corresponding menu; and further comprising menu selecting means for selecting one of the plurality of menus in response to pointing to the menu selecting item with the coordinate indicator and operating a predetermined switch.

15. A status converting method for a coordinate reading apparatus having a coordinate indicator provided with a plurality of switches and a tablet provided with a menu portion having at least one selectable menu item for designating a function to be assigned to a selected switch, the coordinate reading apparatus being connected to an information processing unit to input a coordinate value for a position on the tablet pointed to by the coordinate indicator and a status of the switches to the information processing unit for performing predetermined processing, the status converting method for a coordinate reading apparatus comprising the steps of:

the process of distinguishing that the coordinate value of a position pointed to by the coordinate indicator is included in a region of the menu portion at which a selectable menu item for assigning a function to a respective switch is located, determining that the respective switch has become a predetermined state corresponding to menu reading, selecting functional data that is to be output upon operation of the respective switch and switch status data representing a status of the respective switch necessary to perform the function assigned thereto; and the process of storing the selected functional data.

16. A status converting method for a coordinate reading apparatus having a coordinate indicator provided with a menu-pointing switch and at least one programmable switch, and a tablet provided with a menu portion having at least one first selectable menu item for selecting the at least one programmable switch and at least one second selectable menu item for designating a function to be assigned to a programmable switch, the coordinate reading apparatus being connected to an information processing unit to input a coordinate value for a position pointed to by the coordinate indicator to the information processing unit for performing predetermined processing, the status converting method for a coordinate reading apparatus comprising the steps of:

a first process of distinguishing that the coordinate value of a position pointed to by the coordinate indicator is included in a region of the menu portion at which a respective second selectable menu item is located for selecting a programmable switch and determining that the menu-pointing switch has become a predetermined state corresponding to menu reading, and selecting one programmable switch designated by the respective second selectable menu item and switch status data representing a status of the respective programmable switch necessary to perform a function assigned thereto;

a second process of distinguishing that the coordinate value for the position indicated by said coordinate indicator is included in a region of the menu portion at which a first selectable menu item for assigning a function to a respective switch is located and determining that the menu-pointing switch has become a predetermined state corresponding to menu reading, to select functional data that is to be output upon operation of the respective programmable switch;

wherein the first process is performed before the second process, or the second process is performed before the first process; and the process of storing switch status data selected by said first process and the functional data selected by said second process.

17. A status converting method for a coordinate reading apparatus having a coordinate indicator provided with a plurality of switches and a tablet provided with a menu portion having at least one selectable menu item for designating a function to be assigned to a respective switch, the coordinate reading apparatus being connected to an information processing unit to input a coordinate value of a position pointed to by the coordinate indicator and a status of the switches to the information processing unit for performing predetermined processing, the status converting method for a coordinate reading apparatus comprising the steps of:

the process of distinguishing that the coordinate value of a position on the tablet pointed to by the coordinate indicator is included in a region of the menu portion at which a selectable menu item for assigning a function to a respective switch is located and determining whether any of the plurality of switches is operated to become a predetermined state corresponding to menu reading, to select functional data that is to be output upon operation of the respective switch and switch status data representing a status of the respective switch necessary to perform the function assigned thereto; and the process of storing the switch status data and the functional data selected.

18. A status converting method for a coordinate reading apparatus having a pen-shaped stylus pen type coordinate indicator having an outer tubular shaft having an opening formed at one end thereof, an inner core having a nib portion, the inner core disposed to undergo axial movement within the shaft so that the nib portion is selectively extendable through the opening formed at one end of the shaft, and a plurality of switches, including a pen switch mounted to the coordinate indicator to undergo axial movement in conjunction with the axial movement of the inner core so that the pen switch is turned on when the nib portion is extended through the opening and is turned off when the nib portion is retracted within the shaft, and a side switch mounted on the tubular shaft, and a tablet provided with a menu portion provided with at least one selectable menu item for designating a function to be assigned to the side switch, the coordinate reading apparatus being connected to an information processing unit to input a coordinate value of a position pointed to by the stylus pen and a status of the switches to the information processing unit for performing predetermined processing, the status converting method for a coordinate reading apparatus comprising the steps of:

the process of distinguishing that the coordinate value of a position pointed to by the stylus pen is included in a region of the menu portion of the tablet at which a respective selectable menu item is located and determining that the pen switch has become a predetermined state corresponding to menu reading, to select functional data that is to be output upon operation of the side switch and switch status data representing a status of the side switch necessary to perform the function assigned thereto; and the process of storing the selected functional data.

19. A status converting method for a coordinate reading apparatus having a coordinate indicator provided with a plurality of switches, including a menu-pointing switch and at least one programmable switch, a tablet provided with a menu portion having at least one first selectable menu item for selecting the at least one programmable switch and at least one second selectable menu item for designating a function to be assigned to a respective programmable switch, the coordinate reading apparatus being connected to an information processing unit to input a coordinate value of a position pointed to by the coordinate indicator and a status of the switches to the information processing unit for performing predetermined processing, the status converting method for a coordinate reading apparatus comprising the steps of:

the process of distinguishing that the coordinate value of a position pointed to by the coordinate indicator is included in a region of the menu portion of the tablet at which a second selectable menu item is located and determining that a selected switch has become a predetermined state corresponding to menu reading, to select functional data that is to be output upon operation of the selected switch and switch status data representing a status of the selected switch necessary to perform the function assigned thereto;

the process of storing the selected functional data;

the process of determining that an operated switch is a switch corresponding to the functional data stored and further determining that the status of the operated switch coincides with the stored switch status data; and the process of outputting the functional data to be output when the status of the operated switch coincides with the stored switch status data.

20. A status converting method for a coordinate reading apparatus having a coordinate indicator provided with a plurality of switches, including a menu-pointing switch and at least one programmable switch, and a tablet provided with a first menu having at least one first menu item for selecting the at least one programmable switch and a second menu having a plurality of second menu items for designating a function to be assigned to a selected switch, the coordinate reading apparatus being connected to an information processing unit to input a coordinate value of a position pointed to by the coordinate indicator and a status of the switches to the information processing unit for performing predetermined processing, the status converting method for a coordinate reading apparatus comprising the steps of:

a first process of distinguishing that the coordinate value of a position pointed to by the coordinate indicator is included in a region of the first menu for selecting a programmable switch, and determining that the menu-pointing switch has become a predetermined state corresponding to menu reading, to select a programmable switch and switch status data representing a status of the selected programmable switch necessary to perform a function assigned thereto;

the second process of distinguishing that the coordinate value of a position on the tablet pointed to by the coordinate indicator is included in a region of the second menu at which a second menu item is located, and determining that the menu-pointing switch has become a predetermined state corresponding to menu reading, to select functional data that is to be output upon operation of the respective switch to perform the function assigned thereto;

wherein the first process is performed before the second process, or the second process is performed before the first process;

the process of storing switch status data selected by the first process and the functional data selected by the second process;

the process of determining that an operated switch is a switch corresponding to the stored functional data and further determining that the status of the operated switch coincides with the stored switch status data; and the process of outputting the functional data to be output when the status of the operated switch coincides with the stored switch status data.

21. A status converting method for a coordinate reading having a coordinate indicator provided with a plurality of switches and a tablet provided with a menu portion having at least one selectable menu item for designating a function to be assigned to a selected switch, the coordinate reading apparatus being connected to an information processing unit to input a coordinate value of a position on the tablet pointed to by the coordinate indicator and a status of the switches to the information processing unit for performing predetermined processing, the status converting method for a coordinate reading apparatus comprising the steps of:

the process of distinguishing that the coordinate value of a position pointed to by the coordinate indicator is included in a region of the menu portion at which a selectable menu item for assigning a function to a respective switch is located and determining whether any of the plurality of switches is operated to enter a predetermined state corresponding to menu reading, to select functional data that is to be output upon operation of the respective switch and switch status data representing a status of the respective switch necessary to perform the function assigned thereto;

the process of storing the switch status data and the selected functional data;

the process of determining that an operated switch is a switch corresponding to the stored functional data and further determining that the status of the operated switch coincides with the stored switch status data; and the process of outputting the functional data to be output when the status of the operated switch coincides with the stored switch status data.

22. A status converting method for a coordinate reading having a pen-shaped stylus pen type coordinate indicator having an outer tubular shaft having an opening formed at one end, an inner core having a nib portion, the inner core disposed to undergo axial movement within the shaft so that the nib portion is selectively extendable through the opening formed at one end of the shaft, and a plurality of switches, including a pen switch mounted to the coordinate indicator to undergo axial movement in conjunction with the axial movement of the inner core so that the pen switch is turned on when the nib portion is extended through the opening and is turned off when the nib portion is retracted within the shaft, and a side switch mounted on the tubular shaft, and a tablet provided with a menu portion provided with at least one selectable menu item for designating a function to be assigned to the side switch, the coordinate reading apparatus being connected to an information processing unit to input a coordinate value of a position pointed to by the stylus pen and a status of the switches to the information processing unit for performing predetermined processing, the status converting method for a coordinate reading apparatus comprising the steps of:

the process of distinguishing that the coordinate value of a position pointed to by the stylus pen is included in a region of the menu portion of the tablet at which a respective selectable menu item is located and determining that the pen switch has become a predetermined state corresponding to menu reading, to select functional data that is to be output upon operation of the side switch and switch status data representing a status of the side switch necessary to perform the function assigned thereto;

the process of storing the selected functional data;

the process of determining that an operated side switch is the side switch corresponding to the stored functional data and further determining that the status of the operated switch coincides with the stored switch status data; and the process of outputting the functional data to be output when the status of the operated side switch coincides with the stored switch status data.

23. A status converting method for a coordinate reading apparatus as recited in claim 15; wherein the tablet is provided with a plurality of menu regions each having at least one first selectable menu item for assigning a function to a respective switch on the coordinate indicator, and a second selectable menu item associated with each menu region for selecting the corresponding menu region; and further comprising menu selecting means for selecting one of the plurality of menu regions in response to pointing to a second selectable menu item with the coordinate indicator and operating a predetermined switch.

24. A status converting method for a coordinate reading apparatus as recited in claim 15; wherein the tablet is receptive of a plurality of different menu sheets each displaying thereon a menu comprising at least one first selectable menu item for designating a function to be assigned to a switch and a second selectable menu item for selecting the corresponding menu; and further comprising menu selecting means for selecting one of the plurality of menu sheets in response to pointing to a second selectable menu item associated with a menu sheet with the coordinate indicator and operating a predetermined switch.

25. A status converting method for a coordinate reading apparatus as recited in claim 15; wherein the menu portion comprises a plurality of menu sheets each displaying a plurality of first selectable menu items each for designating a function to be assigned to a selected switch and a second selectable menu item for selecting the corresponding menu; and further comprising menu selecting means for selecting one of the plurality of menu sheets by pointing to the corresponding second selectable menu item with the coordinate indicator and operating a predetermined switch.

26. A status converting method for a coordinate reading apparatus as recited in claim 15; wherein the function designated by the at least one menu item comprises the outputting of one or more keyboard codes so that operation of a selected switch having a function assigned thereto results in the outputting of the one or more keyboard codes.

27. A status converting method for a coordinate reading apparatus as recited in claim 15; wherein the menu portion comprises a plurality of separate menus, each being displayed on a separate menu sheet mountable on the tablet, each menu sheet having at least one first selectable menu item for designating one or more keyboard codes to be assigned to a switch and a second selectable menu item for selecting a corresponding menu; and further comprising menu selecting means for selecting one of the plurality of menus in response to pointing to a corresponding second selectable menu item with the coordinate indicator and operating a predetermined switch.

28. A status converting method for a coordinate reading apparatus as recited in claim 15; wherein the menu portion comprises a plurality of separate menus, each being displayed on a separate menu sheet having at least one selectable menu item for designating one or more keyboard codes to be assigned to a switch and a second selectable menu item for selecting a corresponding menu; and further comprising menu selecting means for selecting one of the plurality of menus in response to pointing to a corresponding second selectable menu item with the coordinate indicator.

29. In a coordinate reading system having a coordinate reading apparatus having a coordinate indicator provided with a plurality of switches and a tablet provided with a menu portion having at least one selectable menu item for assigning a function to a selected switch, the coordinate reading apparatus being connected to an information processing unit to input a coordinate value for a position indicated by the coordinate indicator and a status of the selected switch to the information processing unit for performing predetermined processing, an interface unit for a coordinate reading apparatus being connected between the coordinate reading apparatus and the information processing unit to serve as an interface for the coordinate value and the switch status, the interface unit for a coordinate reading apparatus comprising:

function selecting means for distinguishing that the coordinate value for the position on the tablet pointed to by the coordinate indicator is included in a region of the menu portion at which a selectable menu item for assigning a function to a respective switch is located and determining that the respective switch has become a predetermined state corresponding to menu reading, to select functional data that is to be output upon operation of the respective switch and switch status data representing a status of the respective switch necessary to perform the function assigned thereto;

a memory for storing the functional data selected by said function selecting means;

conversion status determining means for determining that an operated switch is a switch corresponding to the functional data stored in the memory and further determining that the status of the operated switch coincides with the stored switch status data; and conversion status output means for outputting functional data to be output when the status of the operated switch coincides with the stored switch status data.

30. In a coordinate reading system having a coordinate reading apparatus having a coordinate indicator provided with a plurality of switches, including a menu-pointing switch and at least one programmable switch, a menu portion having at least one first selectable menu item for selecting a programmable switch and at least one second selectable menu item for designating a function to be assigned to a selected programmable switch, the coordinate reading apparatus being connected to an information processing unit to input a coordinate value of a position pointed to by the coordinate indicator to the information processing unit for performing predetermined processing, an interface unit for a coordinate reading apparatus being connected between the coordinate reading apparatus and the information processing unit to serve as an interface for the coordinate value, the interface unit for a coordinate reading apparatus comprising:

switch selecting means for distinguishing that the coordinate value of a position pointed to by the coordinate indicator is included in a region of the menu at which a first selectable menu item is located for selecting a respective programmable switch, and determining that the menu-pointing switch has become a predetermined state corresponding to menu reading, to select the respective programmable switch;

function selecting means for determining that the coordinate value of a position pointed to by the coordinate indicator is included in a menu region at which a second selectable menu item is located for assigning a function to a selected programmable switch and determining that the menu-pointing switch has become a predetermined state corresponding to menu reading, to select functional data that is to be output upon operation of the selected programmable switch and switch status data representing a status of the selected programmable switch necessary to perform the function assigned thereto;

a memory for storing the switch status data switch selecting means and the functional data selected by the function selecting means;

conversion status determining means for determining that an operated switch is a switch corresponding to the functional data stored in the memory and further determining that the status of the operated switch coincides with the switch status data stored in the memory; and conversion status output means for outputting functional data to be output to perform the function when the status of the operated switch is coincident with the switch status data as determined by the conversion status determining means.

31. In a coordinate reading system having a coordinate reading apparatus having a coordinate indicator provided with a plurality of switches and a tablet provided with a menu portion having at least one selectable menu item for designating a function to be assigned to a selected switch, the coordinate reading apparatus being connected to an information processing unit to input a coordinate value of a position pointed to by the coordinate indicator and a status of the switches to the information processing unit for performing predetermined processing, an interface unit for a coordinate reading apparatus being connected between the coordinate reading apparatus and the information processing unit to serve as an interface for the coordinate value and the status of the switches, the interface unit for a coordinate reading apparatus comprising:

function selecting means for determining that the coordinate value of a position pointed to by the coordinate indicator is included in a menu region at which a selectable menu item is located for assigning a function to a selected switch and determining that the selected switch to be set with the function has become a predetermined state corresponding to menu reading, to select functional data that is to be output upon operation of the selected switch and switch status data representing a status of the selected switch necessary to perform the function assigned thereto;

a memory for storing the switch status data and the functional data selected by the function selecting means;

conversion status determining means for determining that an operated switch is a switch corresponding to the functional data stored in the memory and further determining that the status of the operated switch coincides with the switch status data stored in the memory; and conversion status output means for outputting functional data to be output to perform the function when the status of the operated switch is coincident with the switch status data as determined by the conversion status determining means.

32. In a coordinate reading system having a coordinate reading apparatus having a pen-shaped stylus pen type coordinate indicator comprising an outer tubular shaft having an opening formed at one end, an inner core having a nib portion, the inner core being disposed to undergo axial movement within the shaft so that the nib portion is selectively extendable through the opening, and a plurality of switches including a pen switch mounted to the coordinate indicator to undergo axial movement in conjunction with the axial movement of the inner core so that the pen switch is turned on when the nib portion is extended through the opening and is turned off when the nib portion is retracted within the shaft, and a side switch mounted on the tubular shaft, and a tablet provided with a menu portion having at least one selectable menu item for designating a function to be assigned to the side switch, the coordinate reading apparatus being connected to an information processing unit to input a coordinate value of a position pointed to by the stylus pen and a status of an operated switch to the information processing unit for performing predetermined processing, an interface unit for a coordinate reading apparatus being connected between the coordinate reading apparatus and the information processing unit to serve as an interface for the coordinate value and the status of the operated switch, the interface unit for a coordinate reading apparatus comprising:

function selecting means for determining that the coordinate value of a position pointed to by the stylus pen is included in a region of the menu at which a selectable menu item is located for assigning a function to the side switch and determining that the pen switch has become a predetermined state corresponding to menu reading, to select functional data that is to be output to perform the function designated by the selectable menu item and switch status data representing a status of the side switch necessary to perform the function assigned thereto;

a memory for storing the functional data selected by the function selecting means;

conversion status determining means for determining that the status of the operated side switch coincides with the switch status data; and conversion status output means for outputting the functional data to be output when the status of the operated switch is determined to be coincident with the switch status data by the conversion status determining means.

33. An interface unit for a coordinate reading apparatus as recited in claim 29; wherein the tablet is provided with a plurality of menu regions each having at least one first selectable menu item for designating a function to be assigned to a respective switch on the coordinate indicator, and a second selectable menu item associated with each menu region for selecting the corresponding menu region; and further comprising menu selecting means for selecting one of the plurality of menu regions in response to pointing to a corresponding second selectable menu item with the coordinate indicator and operating a predetermined switch.

34. An interface unit for a coordinate reading apparatus as recited in claim 29; wherein the tablet is receptive of a plurality of menu sheets each displaying thereon a menu comprising at least one first selectable menu item for designating a function to be assigned to a switch and a second selectable menu item for selecting the corresponding menu, and further comprising menu selecting means for selecting one of the plurality of menu sheets in response to pointing to a second selectable menu item associated with a menu sheet with the coordinate indicator and operating a predetermined switch.

35. An interface unit for a coordinate reading apparatus as recited in claim 29; wherein the menu portion comprises a plurality of menu sheets each displaying a plurality of first selectable menu items each for designating a function to be assigned to a selected switch and a second selectable menu item for selecting the corresponding menu; and further comprising menu selecting means for selecting one of the plurality of menu sheets in response to pointing to the corresponding second selectable menu item with the coordinate indicator and operating a predetermined switch.

36. An interface unit for a coordinate reading apparatus as recited in claim 29; wherein the function designated by the at least one selectable menu item comprises the outputting of one or more keyboard codes so that operation of a selected switch having a function assigned thereto results in the outputting of the one or more keyboard codes.

37. An interface unit for a coordinate reading apparatus as recited in claim 29; wherein the menu portion comprises a plurality of separate menus, each being displayed on a separate menu sheet mountable on the tablet, each menu sheet having at least one first selectable menu item for designating one or more keyboard codes to be assigned to a switch and a second selectable menu item for selecting a corresponding menu; and further comprising menu selecting means for selecting one of the plurality of menus in response to pointing to a corresponding second selectable menu item with the coordinate indicator and operating a predetermined switch.

38. An interface unit for a coordinate reading apparatus as recited in claim 29; wherein the menu portion comprises a plurality of separate menus, each being displayed on a separate menu sheet having at least one selectable menu item for designating one or more keyboard codes to be assigned to a switch and a second selectable menu item for selecting a corresponding menu; and further comprising menu selecting means for selecting one of the plurality of menus in response to pointing to a corresponding second selectable menu item with the coordinate indicator and operating a predetermined switch.

39. A coordinate reading system having a coordinate reading apparatus comprising a coordinate indicator having a plurality of switches and a tablet provided with a menu provided with at least one selectable menu item for designating a function to be assigned to a selected switch, an interface unit connected to the coordinate reading apparatus to serve as an interface for the coordinate value and the status of the switches, and an information processing unit connected to the interface unit, so that a coordinate value of a position pointed to by the coordinate indicator and a status of the switches are input to the information processing unit for performing predetermined processing, the coordinate reading system comprising:

function selecting means for distinguishing that the coordinate value of a position pointed to by the coordinate indicator is included in a region of the menu at which a selectable menu item is located for assigning a function to a selected switch and determining that the selected switch has become a predetermined state corresponding to menu reading, to select functional data that is to be output upon operation of the selected switch and switch status data representing a status of the respective switch necessary to perform the assigned function;

a memory for storing the functional data selected by the function selecting means;

conversion status determining means for determining that an operated switch is a switch corresponding to the functional data stored in the memory and further determining that the status pattern of the operated switch coincides with the switch status data; and conversion status output means for outputting functional data when the status of the operated switch is determined to be coincident with the switch status data by the conversion status determining means.

40. A coordinate reading system having a coordinate reading apparatus comprising a coordinate indicator having a plurality of switches, including a menu-pointing switch and at least one programmable switch, a menu having at least one first selectable menu item for selecting the at least one programmable switch, and a tablet provided with a menu having a plurality of second selectable menu items for designating a function to be assigned to a selected programmable switch, an interface unit connected to the coordinate reading apparatus to serve as an interface for the coordinate value and the switch status, and an information processing unit connected to the interface unit, so that a coordinate value of a position pointed to by the coordinate indicator and a switch status are input to the information processing unit for performing predetermined processing, the coordinate reading system comprising:

switch selecting means for distinguishing that the coordinate value of a position pointed to by the coordinate indicator is included in a region of the menu at which a first selectable menu item is located for selecting a programmable switch and determining that the menu-pointing switch has become a predetermined state corresponding to menu reading, to select a respective programmable switch;

function selecting means for determining that the coordinate value of a position pointed to by the coordinate indicator is included in a region of the menu at which a second selectable menu item is located for assigning a function to a selected programmable switch and determining that the menu-pointing switch has become a predetermined state corresponding to menu reading, to select functional data that is to be output upon operation of the respective switch and switch status data representing a status of the selected switch necessary to perform the function assigned thereto;

a memory for storing switch information selected by the switch selecting means and functional data selected by the function selecting means;

conversion status determining means for determining that an operated switch is a switch corresponding to the functional data stored in the memory means and further determining that the status of the operated switch coincides with the switch status information stored in the memory; and conversion status output means for outputting functional data when the status of the operated switch is determined to be coincident with the switch status information by the conversion status determining means.

41. A coordinate reading system having a coordinate reading apparatus comprising a coordinate indicator having a plurality of switches and a tablet provided with a menu portion having at least one selectable menu item for designating a function to be assigned to a selected switch, an interface unit connected to the coordinate reading apparatus to serve as an interface for the coordinate value and the status of the selected switch, and an information processing unit connected to the interface unit, so that a coordinate value for a position pointed to by the coordinate indicator and a status of the selected switch are input to the information processing unit for performing predetermined processing, the coordinate reading system comprising:

function selecting means for determining that the coordinate value of a position pointed to by the coordinate indicator is included in a region of the menu at which a selectable menu item is located for assigning a function to a selected switch and determining that the selected switch has become a predetermined state corresponding to menu reading, to select functional data that is to be output upon operation of the respective switch and switch status data representing a status of the selected switch necessary to perform the function assigned thereto;

a memory for storing the switch status data and the functional data selected by the function selecting means;

conversion status determining means for determining that an operated switch is a switch corresponding to the functional data stored in the memory and further determining that the status of the operated switch coincides with the switch status data stored in the memory; and conversion status output means for outputting the functional data to be output when the status of the switch is determined to be coincident with the switch status data by the conversion status determining means.

42. A coordinate reading system having a coordinate reading apparatus comprising a pen-shaped stylus pen type coordinate indicator having an outer tubular shaft having an opening formed at one end thereof, an inner core having a nib portion, the inner core disposed to undergo axial movement within the shaft so that the nib portion is selectively extendable through the opening formed at one end of the shaft, and a plurality of switches, including a pen switch mounted to the coordinate indicator to undergo axial movement in conjunction with the axial movement of the inner core so that the pen switch is turned on when the nib portion is extended through the opening and is turned off when the nib portion is retracted within the shaft, and a side switch mounted on the tubular shaft, and a tablet provided with at least one selectable menu item for designating a function to be assigned to the side switch, an interface unit connected to the coordinate reading apparatus to serve as an interface for a coordinate value and switch status determined by the coordinate reading apparatus, and an information processing unit connected to the interface unit, so that a coordinate value of a position pointed to by the coordinate indicator and a status of the switches are input to the information processing unit for performing predetermined processing, the coordinate reading system comprising:

function selecting means for determining that the coordinate value of a position pointed to by the stylus pen is included in a region of the menu at which a selectable menu item is located for assigning a function to the side switch and determining that the side switch has become a predetermined state corresponding to menu reading, to select functional data that is to be output upon operation of the side switch and switch status data representing a status of the side switch necessary to perform the function assigned thereto;

a memory for storing the functional data and the switch status data selected by the function selecting means;

conversion status determining means for determining that the status pattern of an operated side switch coincides with switch status data stored in the memory; and conversion status output means for outputting the functional data to be output when the status of the side switch is determined to be coincident with the switch status data by the conversion status determining means.

43. A coordinate reading system as recited in claim 39; wherein the tablet is provided with a plurality of menu regions each having at least one first selectable menu item for designating a function to be assigned to a respective switch on the coordinate indicator, and a second selectable menu item associated with each menu region for selecting the corresponding menu region; and further comprising menu selecting means for selecting one of the said plurality of menu regions in response to pointing to a corresponding second selectable menu item with the coordinate indicator and operating a predetermined switch.

44. A coordinate reading system as recited in claim 39; wherein the tablet is receptive of a plurality of menu sheets each displaying thereon a menu comprising at least one first selectable menu item for designating a function to be assigned to a switch and a second selectable menu item for selecting the corresponding menu, and further comprising menu selecting means for selecting one of the said plurality of menu sheets in response to pointing to a second selectable menu item associated with a menu sheet with the coordinate indicator and operating a predetermined switch.

45. A coordinate reading apparatus as recited in claim 39; wherein the menu portion comprises plurality of menu sheets each displaying a plurality of first selectable menu items each for designating a function to be assigned to a selected switch and a second selectable menu item for selecting the corresponding menu; and further comprising menu selecting means for selecting one of the plurality of menu sheets in response to pointing to the corresponding second selectable menu item with the coordinate indicator and operating a predetermined switch.

46. A coordinate reading system as recited in claim 39; wherein the function designated by the at least one selectable menu item comprises the outputting of one or more keyboard codes so that operation of a selected switch having a function assigned thereto results in the outputting of the one or more keyboard codes.

47. A coordinate reading system as recited in claim 39; wherein the menu portion comprises a plurality of separate menus, each being displayed on a separate menu sheet mountable on the tablet, each menu sheet having at least one first selectable menu item for designating one or more keyboard codes to be assigned to a switch and a second selectable menu item for selecting a corresponding menu; and further comprising menu selecting means for selecting one of the plurality of menus in response to pointing to a corresponding second selectable menu item with the coordinate indicator and operating a predetermined switch.

48. A coordinate reading system as recited in claim 39; wherein the menu portion comprises a plurality of separate menus, each being displayed on a separate menu sheet having at least one selectable menu item for designating one or more keyboard codes to be assigned to a switch and a second selectable menu item for selecting a corresponding menu; and further comprising menu selecting means for selecting one of the plurality of menus in response to pointing to a corresponding second selectable menu item with the coordinate indicator and operating a predetermined switch.

* * * * *